US010331726B2

(12) United States Patent
Laeuchli et al.

(10) Patent No.: US 10,331,726 B2
(45) Date of Patent: Jun. 25, 2019

(54) RENDERING AND INTERACTING WITH TRANSMEDIA CONTENT DATA

(71) Applicant: DISNEY ENTERPRISES, INC., Burbank, CA (US)

(72) Inventors: Rebekkah Laeuchli, Burbank, CA (US); Max Grosse, Burbank, CA (US); Maria Cabral, Burbank, CA (US); Markus Gross, Burbank, CA (US); Sasha Schriber, Burbank, CA (US); Isa Simo, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 182 days.

(21) Appl. No.: 15/276,506

(22) Filed: Sep. 26, 2016

(65) Prior Publication Data

US 2018/0089201 A1 Mar. 29, 2018

(51) Int. Cl.
*G06F 7/00* (2006.01)
*G06F 16/44* (2019.01)
*G06F 16/28* (2019.01)
*G06F 16/22* (2019.01)
*G06F 16/955* (2019.01)
(Continued)

(52) U.S. Cl.
CPC ........ *G06F 16/444* (2019.01); *G06F 16/2246* (2019.01); *G06F 16/285* (2019.01); *G06F 16/9558* (2019.01); *H04N 21/26258* (2013.01); *H04N 21/8541* (2013.01); *H04N 21/8545* (2013.01); *G06F 3/0488* (2013.01); *G06F 9/451* (2018.02)

(58) Field of Classification Search
CPC ......... G06F 17/30061; G06F 17/30882; G06F 17/30598; G06F 17/30327; G06F 9/451; G06F 30/0488; G06T 1/20
USPC ................................ 707/725, 797, 798, 805
See application file for complete search history.

(56) References Cited

U.S. PATENT DOCUMENTS

RE44,559 E * 10/2013 Flinn .............................. 706/12
2006/0200435 A1 * 9/2006 Flinn .................... G06N 99/005
706/12
(Continued)

*Primary Examiner* — Mohammed R Uddin
(74) *Attorney, Agent, or Firm* — Kilpatrick Townsend & Stockton LLP

(57) ABSTRACT

A method is provided for rendering a representation of and interacting with transmedia content on an electronic device. Transmedia content data is received at the electronic device. The transmedia content data comprises: a plurality of transmedia content data items; linking data which define time-ordered content links between the plurality of transmedia content data items, whereby the plurality of transmedia content data items are arranged into linked transmedia content subsets comprising different groups of the transmedia content data items and different content links therebetween; a visualization model of the transmedia content data; and a hierarchical structure of the linked transmedia content subsets and clusters of linked transmedia content subsets. A representation of the transmedia content data is rendered at the electronic device by processing the visualization model of the transmedia content data and the hierarchical structure to map some or all of the transmedia content at a first level of the hierarchical structure onto the representation of the transmedia content.

34 Claims, 12 Drawing Sheets

(51) Int. Cl.
*H04N 21/262* (2011.01)
*H04N 21/8541* (2011.01)
*H04N 21/8545* (2011.01)
*G06F 3/0488* (2013.01)
*G06F 9/451* (2018.01)

(56) References Cited

U.S. PATENT DOCUMENTS

| | | | | |
|---|---|---|---|---|
| 2006/0242554 | A1* | 10/2006 | Gerace | G06F 17/30867 |
| | | | | 715/209 |
| 2007/0226640 | A1* | 9/2007 | Holbrook | G06F 17/30864 |
| | | | | 715/765 |
| 2011/0276396 | A1* | 11/2011 | Rathod | G06F 17/30867 |
| | | | | 705/14.49 |
| 2012/0290950 | A1* | 11/2012 | Rapaport | H04L 51/32 |
| | | | | 715/753 |
| 2013/0013622 | A1* | 1/2013 | Elliot-McCrea | |
| | | | | G06F 17/30038 |
| | | | | 707/751 |
| 2013/0073336 | A1* | 3/2013 | Heath | G06Q 30/02 |
| | | | | 705/7.29 |
| 2013/0232430 | A1* | 9/2013 | Reitan | G06F 3/0484 |
| | | | | 715/765 |
| 2013/0251344 | A1* | 9/2013 | Joy | G06F 17/30867 |
| | | | | 386/285 |
| 2015/0142888 | A1* | 5/2015 | Browning | H04L 12/1831 |
| | | | | 709/204 |
| 2016/0148159 | A1* | 5/2016 | Coffing | G06Q 10/10 |
| | | | | 705/301 |

\* cited by examiner

RENDERING AND INTERACTING WITH TRANSMEDIA CONTENT DATA

FIELD OF DISCLOSURE

The present disclosure relates to apparatus, systems and methods for processing transmedia content. For example, the disclosure provides for visualising and presenting large quantities of transmedia content data on a display.

BACKGROUND

Influenced by a variety of different multimedia content types, new digital distribution channels, mobile communication devices and an ever increasing use of social media, industry is currently experiencing a disruption in how media is created, distributed and consumed. Classical production pipelines have become less effective as audiences move towards anytime, anywhere, personalized consumption, substituting TV-centric models with multi-device, multichannel models. Individual customers and groups of customers have also become more interactive and participatory, contributing significantly to the creation of new media. The cycles in the traditional creation-distribution-consumption loop become much shorter as consumers constantly provide feedback, resulting in a trend towards ultrashort form content.

Existing delivery platforms, for example YouTube and Facebook, allow for the creation and editing of simple channel based content, using a basic model whereby content creators can upload content such as video, text or images, and users can consume the content in an isolated, linear and mono-medial manner. This can often be done in conjunction with media presented via other platforms such as television or print media. Using such existing platforms, it is difficult for users to share and extend existing content from other users into their own content creation activities.

At the same time, functionality provided by existing multimedia platforms allows the sharing of user-generated content, which, along with social networking, is transforming the media ecosystem. Mobile phones, digital cameras and other pervasive devices produce huge amounts of data that users can continuously distribute in real time. Consequently, content sharing and distribution needs will continue to increase. The content can be of many different forms, known collectively as "transmedia" content.

Existing systems that allow users to generate, organize and share content are generally hard to control: these systems do not offer adequate tools for predicting what the next big trend will be, and which groupings of time-ordered content resonate with particular audiences. Furthermore, visualising the large amount of multimedia information in a way which users can explore and consume is challenging. In particular, visualisation of such large data sets is challenging in terms of performance, especially on lower-power devices such as smartphones or tablets. It is desirable that any visualisation of the data could be rendered in real time such that immediate visual feedback is provided to a user exploring the data. This can be particularly problematic when content from different users and of different types needs to be grouped in a time-ordered manner such that individual items of content may be shared and linked to each other across multiple groups in a non-linear manner.

Finally, the ever-growing availability of content to multiple users and the ever-increasing power of computing resources available to individual users is driving users towards their own individual creation of content, with such content being in multiple formats. This progression can be seen in FIG. 1. User 10 consumes single content items 15. With increasing computing resources, user 20 has developed into an interactive user making choices which affect the flow of individual content items 25 to the user 20. Further, user 30 has recently become more common by generating multiple personalised, individual content items 35 which can be accessed over the Internet 50 by other users. A problem now exists with a current user 40 who can access a considerable amount of different types of content items 35 over the Internet 50 and desires to utilise such content. It would be desirable for user 40 to be able to contribute to and generate new structured groups 46 of linked content items 45.

SUMMARY OF THE DISCLOSURE

In a first aspect of this disclosure, there is provided a computer-implemented method for rendering a representation of and interacting with transmedia content on an electronic device, the method comprising the following steps:
  receiving transmedia content data at the electronic device, the transmedia content data comprising:
    a plurality of transmedia content data items;
    linking data which define time-ordered content links between the plurality of transmedia content data items, the plurality of transmedia content data items being arranged into linked transmedia content subsets comprising different groups of the transmedia content data items and different content links therebetween;
    a visualisation model of the transmedia content data; and
    a hierarchical structure of the linked transmedia content subsets and clusters of linked transmedia content subsets; and
  rendering, at the electronic device, a first representation of the transmedia content data by processing the visualisation model of the transmedia content data and the hierarchical structure to map some or all of the transmedia content at a first level of the hierarchical structure onto the representation of the transmedia content.

The aforementioned method permits the surfacing of transmedia content items in a structured and accessible way to one or more users.

The electronic device may be implemented as user equipment, which may be a computing device, for example a client computing device, such as personal computer, laptop or a handheld computing device. For example, the handheld computing device may be a mobile phone or smartphone. The electronic device may include a user input interface configured to provide user input to the processing circuitry, such as for example the instructions to create a new time-ordered content link. This may be one or more of a keypad or touch-sensitive display. The electronic device may include a display (which may include the touch-sensitive display) configured to output data to a user interacting with the electronic device, including one or more of the content data items.

The hierarchical structure may be a hierarchical tree structure comprising one or more branched time-ordered content links at one or more of the transmedia content items.

The method may further comprise the following steps:
  receiving, via a user input interface of the electronic device, an input command indicative of a zoom request to zoom into an element of the hierarchical structure displayed in the representation; and
  rendering, at the electronic device, a second representation by processing the visualisation model and the hierarchical structure, in which some or all child elements of the zoomed element of the hierarchical structure are displayed.

The method may further comprise the following steps:

receiving, via a user input interface of the electronic device, an input command indicative of a zoom request to zoom out of the current element of the hierarchical structure displayed in the representation; and rendering, at the electronic device, a third representation by processing the visualisation model and the hierarchical structure, wherein some or all of the elements at a higher level of the hierarchical structure are displayed in the third representation.

The user input interface may be a touch screen display, and wherein the user input may be one of: a gesture, a swipe, a tap, a press, and a hold. The user input interface may be a pointing device, and the user input may be one of: a scroll or one or more clicks.

The method may further comprise the step of rendering a smooth transition between the first representation and second or third representation.

The hierarchical structure may be arranged in memory with elements of the lowest level of the hierarchical structure being transmedia content data items, the elements of the second-lowest level being linked transmedia content subsets describing time ordered links between the transmedia content data items of the child elements, and the elements of third-lowest level being clusters of sufficiently similar linked transmedia content subsets.

Layout data for the visualisation model can be generated such that:

at a first level, grouped clusters of transmedia content subsets are represented as a three-dimensional object, at a second level, each cluster of linked transmedia content subsets is represented as an area on the surface of the three dimensional object, at a third level, each linked transmedia content subset is represented by a sub-area within the area of the parent tree element on the surface of the planet, and at a fourth level, each transmedia content data item is represented by a point within the sub-area of the parent tree element on the surface of the three dimensional object.

In the first representation, one or the first, second or third levels of the layout data can be displayed, and in the second representation, a lower level of the layout data can be displayed.

In the first representation, one or the second, third or fourth levels of the layout data can be displayed, and in the third representation, a higher level of the layout data can be displayed.

The transmedia content data items may relate to narrative elements of the transmedia content data items. The time-ordered content links may define a narrative order of the transmedia content data items.

Each time-ordered content link may define a directional link from a first transmedia content data item to a second transmedia content data item of the plurality of transmedia content data items.

The first transmedia content data item may have a plurality of outgoing time-ordered content links. The second transmedia content data item may have a plurality of incoming time-ordered content links.

The memory may be further configured to store a plurality of subset entry points for the plurality of transmedia content subsets. Each subset entry point may be a flag indicating a transmedia content data item that has at least one outgoing time-ordered link and no incoming time-ordered links.

Each linked transmedia content subset may defines a linear path, wherein a linear path can comprise a subset entry point, one or more transmedia content data items and one or more time ordered links between the subset entry point and the transmedia content data items.

Two or more transmedia content subsets can share one or more subset entry points, one or more transmedia content data items and/or one or more time ordered content links.

At the lowest level representation of the transmedia content model, one or more subset entry points can be displayed.

The method may further comprise the steps of:

receiving, via a user input interface of the electronic device, an input command indicative of a selection of a subset entry point; and rendering, at the electronic device, a representation of the one or more linked transmedia content subsets of which the subset entry point is a member.

The method may further comprise the steps of:

receiving a transmedia content data update, wherein the transmedia content data update contains delta updates with respect to the previously received transmedia content data; and rendering, at the electronic device, an updated representation of the transmedia content data by processing the transmedia content data update.

The method may further comprise the steps of:

interpolating a state of the transmedia content data based on previously received transmedia content data and/or transmedia content data updates to generate interpolated transmedia content data; and rendering, at the electronic device, an interpolated representation of the transmedia content data by processing the interpolated transmedia content data.

The visualisation model may be a three-dimensional model representing the transmedia content data items, linked transmedia content subsets and clusters of linked transmedia content subsets in the hierarchical structure.

The representation of the transmedia content data may be a two-dimensional representation of a part of the three-dimensional model.

Each transmedia content data item may be a story element.

The method may further comprise rendering and outputting a chat window containing message data items alongside the first, second or third representation. The message data items displayed in the chat window may be associated with the level of the hierarchical structure that is displayed in the currently output representation. The message data items that are displayed in the chat window can change when the currently output representation changes.

In a second aspect of the present disclosure, there is provided a computer-implemented method for sorting and processing a plurality of transmedia content data items, the plurality of transmedia content data items being arranged into linked transmedia content subsets comprising different groups of the transmedia content data items and different time-ordered content links therebetween, the method comprising the following steps:

calculating similarity between linked transmedia content subsets;

generating a hierarchical structure of linked transmedia content subsets and clusters of linked transmedia content subsets based on the calculated similarity;

for each linked transmedia content subset and each cluster of transmedia content subsets in the hierarchical structure, generating visual characteristics based on the characteristics of the linked transmedia content subset or cluster of linked transmedia content subsets;

generating a visualisation model of the transmedia content based on the hierarchical structure and the visual characteristics;

transmitting, to an electronic device, transmedia content data comprising:
the plurality of transmedia content data items,
linking data which define the time-ordered content links between the plurality of transmedia content data items,
the visualisation model, and
the hierarchical structure.

The hierarchical structure may be a hierarchical tree structure comprising one or more branched time-ordered content links at one or more of the transmedia content items.

The visualisation model may comprise a three-dimensional model on which the elements of the hierarchical structure are organised.

The step of generating a visualisation model may comprise generating a layout of the three-dimensional model based on characteristics of the transmedia content data items, linked transmedia content subsets and clusters of linked transmedia content subsets in the hierarchical structure.

The method may further comprise the following steps:
updating the hierarchical structure, visual characteristics and transmedia content model based on changes to one or more of the transmedia content data items and/or one or more of the linked transmedia content subsets;
generating a delta update based on updated structure, transmedia content model, transmedia content data items and/or linked transmedia content subsets; and
transmitting the delta update to the electronic device.

In a third aspect of the present disclosure, there is provided a computer-readable medium containing computer readable instructions which, when executed by processing circuitry, cause the processing circuitry to perform the steps of the aforementioned methods.

In a fourth aspect of the present disclosure, there is provided an electronic device comprising a memory and processing circuitry, wherein the processing circuitry is configured to perform the steps of the method of any one of first or second aspects.

The electronic device according to the method of the second aspect may be implemented as a computing device, for example a server computing device.

In a fifth aspect of the present disclosure, there is provided a system comprising:
a first electronic device comprising a memory and processing circuitry, wherein the processing circuitry is configured to perform the steps of the method of the first aspect;
a second electronic device, communicatively coupled with the first electronic device, the second electronic device comprising a memory and processing circuitry, wherein the processing circuitry is configured to perform the steps of the method of the second aspect.

BRIEF DESCRIPTION OF DRAWINGS

The present invention is described in exemplary embodiments below with reference to the accompanying drawings in which.

DETAILED DISCLOSURE

Figure 1:
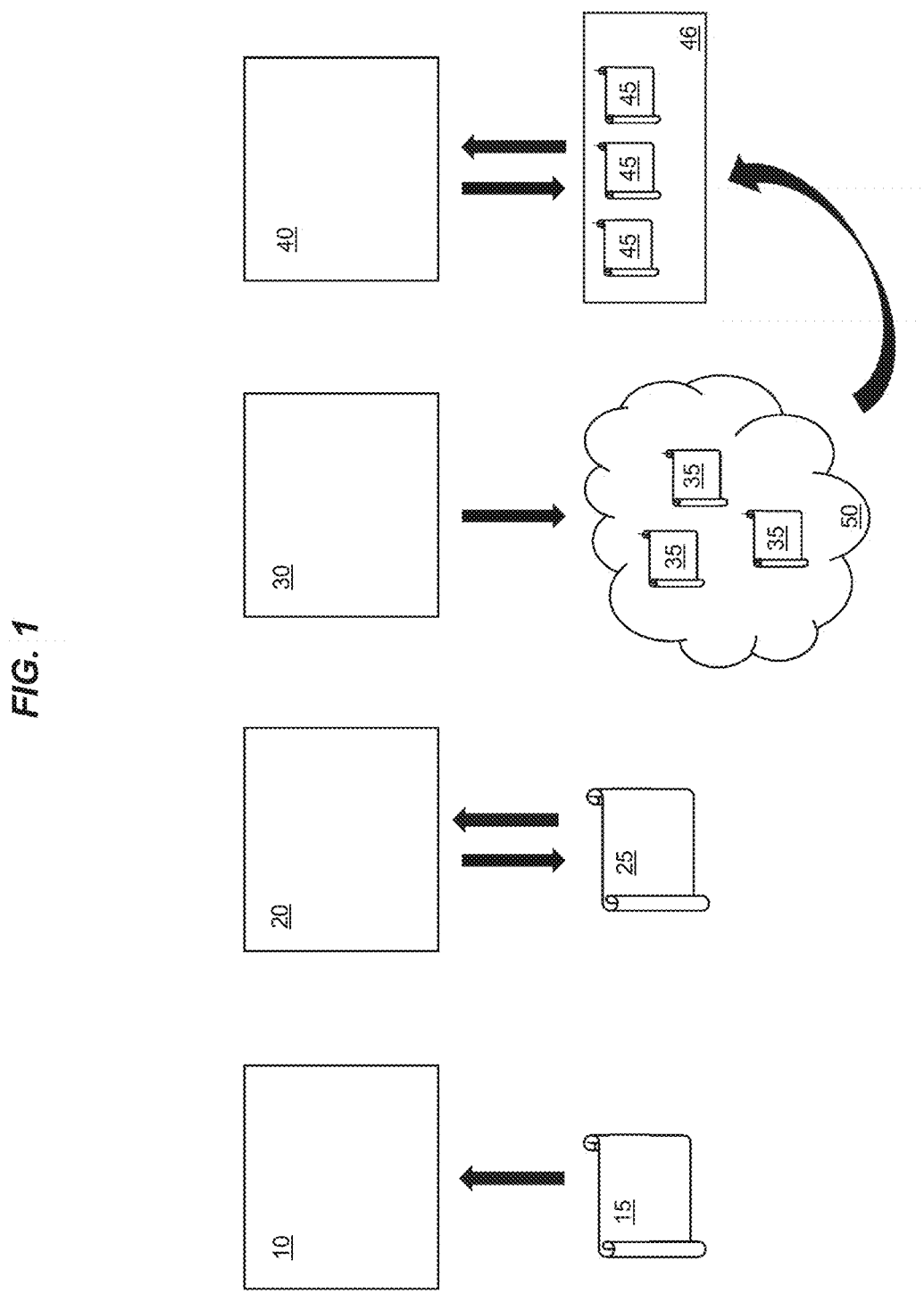
FIG. 1 depicts how users interact with content items according to the present disclosure.

The present disclosure describes a new apparatus, system and method for managing transmedia content. In one embodiment, there is disclosed a platform for the creation, distribution and consumption of transmedia content. The content may be arranged in a time-ordered manner for consumption, thereby defining so-called "story" based content.

In the context of the present disclosure, groups of time-ordered content, for example in the form of stories, are made up of multiple elements of transmedia content, each being referred to herein as a transmedia content data items. Each item can pertain to a narrative element of the story. Each transmedia content data item may be linked, and thus connected, to one or more other transmedia content data items in an ordered fashion such that a user can navigate through subsets of the transmedia content data items (also referred to as transmedia content subsets) in a time-ordered fashion to consume some or all of an entire story.

The term "transmedia" means that the grouped content data items (which are linked within the content subsets) comprise a plurality of different multimedia types, e.g. at least two different types of multimedia content. For example, the different types of transmedia content data of each content data item within the subset can comprise at least two different types from one or more of the following: textual data, image data, video data, audio data, animation data, graphical visualization or UI data, hypertext data, gaming data, interactive experience data, virtual reality (VR) data, augmented reality data, and multisensory experience data. Each transmedia content data item may itself comprise multiple media types, e.g. video and audio data may be present within a single item such that the audio is time-associated associated with the video.

The transmedia content data items can be grouped into transmedia content subsets. Each subset may be grouped based on one or more non-linear network of the content data items.

Within each transmedia content subset, transmedia content data items are linked to one another, directly or indirectly, by time-ordered links between each data item. Typically, each time ordered-content link links two transmedia content data items. An exception exists for a time ordered link which connects a subset entry point and a transmedia content data item as explained below. The time-ordered link also defines a direction between the two transmedia content data items. The direction indicates an order in which linked transmedia content data items should be presented to a user of the system. For example, when a first transmedia content data item is presented to a user, at least one outgoing time-ordered link (i.e. the direction defined by the link is away from the first transmedia content data item) indicates a second transmedia content item that should be presented to the user next.

The term "subset" is used to denote a subset of transmedia content data items within the set of all transmedia content data items stored by the system. The transmedia content data items that are part of a transmedia content subset are all directly or indirectly connected to each via time-ordered content links between the transmedia content data items. A transmedia content subset may be a linear, i.e. each transmedia content data item in the subset has at most one incoming time-ordered content link and one outgoing time-ordered content link, or a non-linear network, i.e. one or more of the constituent transmedia content data items has more than one incoming or outgoing time-ordered content link. It will also be appreciated a non-linear network of transmedia content data items can be considered to be made up of multiple overlapping linear paths from start-point to end-point through that network, and that each linear path may also be considered to be a transmedia content subset. Furthermore, the term "group" has been used to denote a collection of transmedia content data items that are not necessarily connected, directly or indirectly, via time-ordered content links. However, where the term "group" has been used, a "subset" of transmedia content data items, as defined above, may additionally be formed and utilised.

Each time-ordered link is stored in memory as link data comprising: the input content data item; and the output content data item and thus implicitly a direction between two content data items. Directional data for the links is also stored which defines the path the links should be processed, and thus the order for processing of transmedia content items. The order can also be dependent on user interaction with each item as it is surfaced to a user.

Figure 2C:
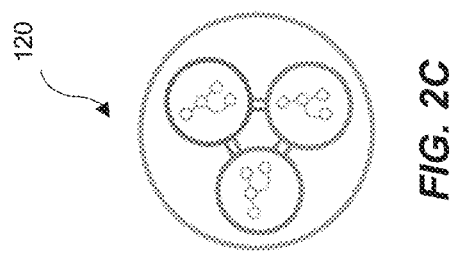
FIGS. 2A, 2B and 2C depict a linear transmedia content subset, grouped non-linear transmedia content subsets, and a subset universe respectively, each formed of multiple transmedia content data items and time-ordered content links.
Figure 2B:
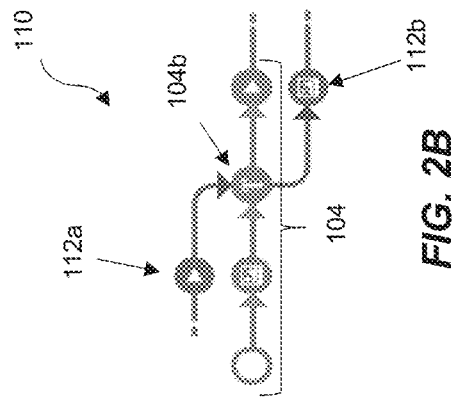
Figure 2A:
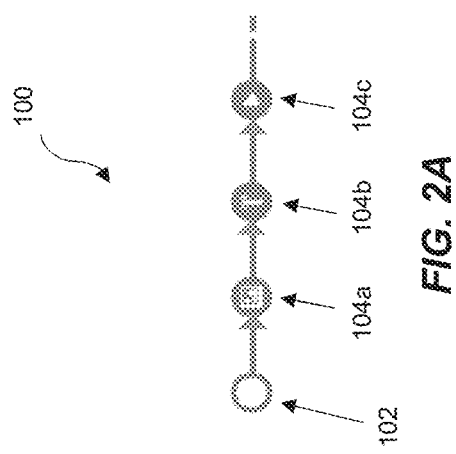

Examples of transmedia content subsets are depicted in FIGS. 2A, 2B and 2C. As mentioned above, the transmedia content data items are grouped into transmedia content subsets.

In FIG. 2A, subset 100 defines a linear path of transmedia content data items 104a-c. The subset 100 also comprises a subset entry point 102, which defines a starting point in the subset from which the system can commence presenting the transmedia content data items within the subset. The subset entry point 102 may be linked to the first transmedia content data item 104a by a time-ordered link, or may be a flag associated with the first transmedia content data item 104a which indicates that the transmedia content data item 104a is the first in the subset.

In the context of the present disclosure, the term "linear" means that each transmedia content data item has, at most, only one incoming time-ordered line (i.e. the direction defined by the link is inwards towards the transmedia content data item) and only one outgoing time-ordered link. The path defined by the transmedia content subset 100 is unidirectional and there is only one possible route from the subset entry point 102 and the final transmedia content data item of the path (i.e. a transmedia content data item with an incoming time-ordered link but no outgoing time ordered link).

The transmedia content data items may also be grouped based on multiple content subsets in a non-linear network, such as non-linear network 110 depicted in FIG. 2B. In this context, the term "non-linear" means that time-ordered links between the data items of each network may form a plurality of different paths through the network 110 which start in different places, end in different places, branch, split, diverge, leave some data items out of the path and/or overlap with other paths. Such a non-linear network 110 can also be considered to be a group of transmedia content subsets which share one or more transmedia content data items and/or time-ordered content links.

In the depicted non-linear network 110, each transmedia content data item 104a-c, 112a-b can have one or more incoming time-ordered links and one or more outgoing time-ordered links. The data items 112a, 104b and 112b form a second transmedia content subset which shares the data item 104b with the first transmedia content subset 100.

FIG. 2C depicts a story universe 120, in which multiple, related non-linear networks are grouped or clustered together. In one embodiment, the non-linear networks of a story universe do not share transmedia content data items and/or time-ordered links with the non-linear networks of another, different story universe. However, in an alternative embodiment, the non-linear networks of a story universe do share one or more transmedia content data items and/or time-ordered links with the non-linear networks of another, different story universe.

The system of the present disclosure manages the transmedia content data items, transmedia content subsets and one or more non-linear networks, facilitates the generation and manipulation of items between and within subsets and networks so that storylines can be formed. Accordingly, the creation of transmedia content subsets and non-linear networks by a user of the system enables collaboration between users of the system and allows consumption of the created storylines. The architecture of the system is depicted in FIG. 3.

Figure 3:
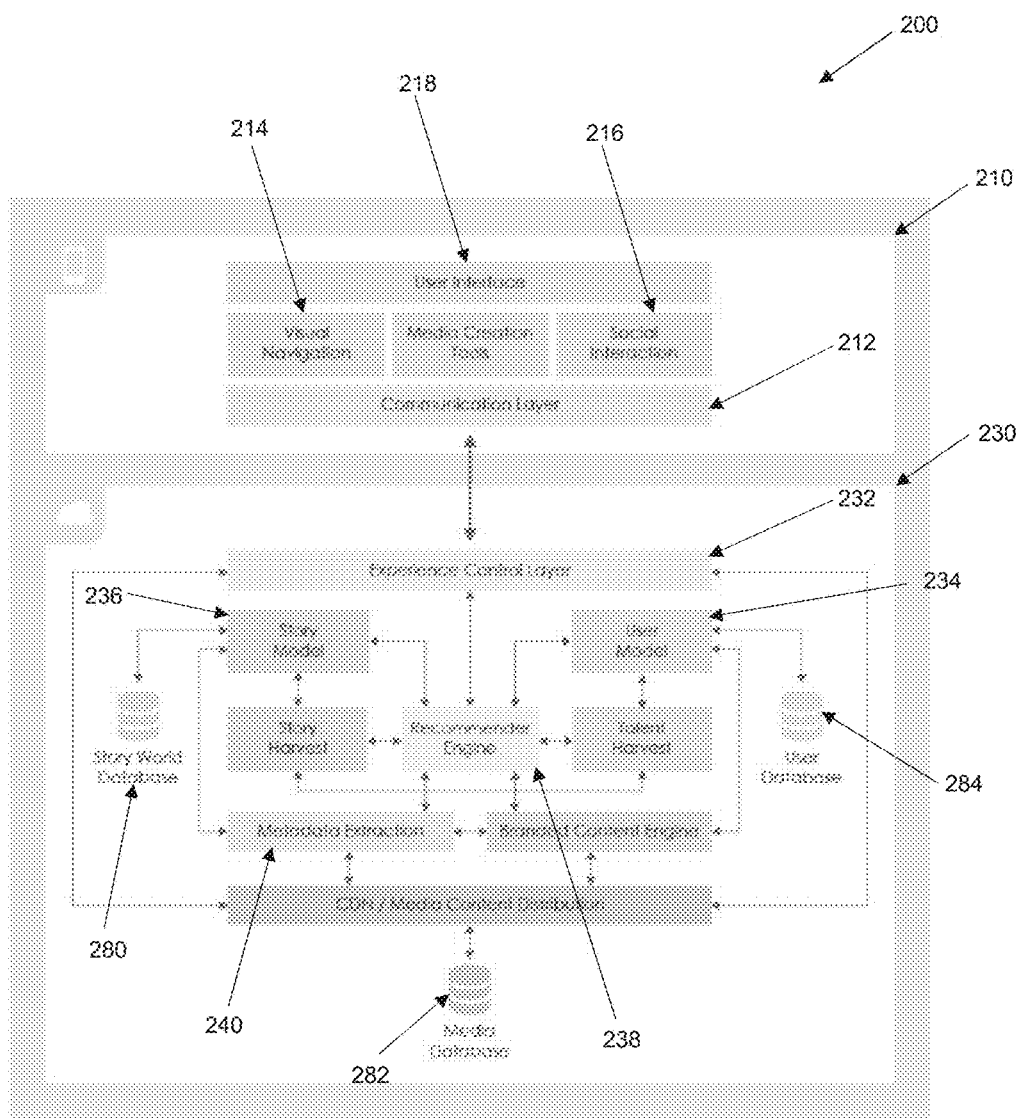
FIG. 3 depicts the architecture of the system of the present disclosure.

FIG. 3 depicts the overall architecture of the system 200. The system 200 includes a front end device 210, which is typically located on a user device such as a smartphone, tablet or PC that is operated directly by the user of the system 200, and a back end device 230, which is typically located on one or more servers that are connected to the user device via a network such as the Internet.

The back end 230 contains global resources and processes that are managed, stored and executed at a central location or several distributed locations. The front end 210 contains resources and processes that are stored and executed on an individual user device. The back end 230 is responsible for tasks that operate on large amounts of data and across multiple users and stories, while the front end 210 only has access to the resources of a particular user (or a group of users) and focuses on presentation and interaction.

The front end 210 communicates with the back end 230 via the network, the communication layer 212 that is part of the front end 210 and the experience control layer 232 that is part of the back end 230. The experience control layer 232 is responsible for handling the distribution of transmedia content data items, access limitations, security and privacy aspects, handling of inappropriate content data items, and user-specific limitations such as age group restrictions. It ensures that inappropriate, illegal, unlicensed or IP-violating content is flagged and/or removed, either automatically, semi-automatically or manually. It also handles sessions as the user interacts with the system and provides session specific contextual information, including the user's geolocation, consumption environment and consumption device, which can then be used by the front end 210 to adapt the consumption experience accordingly. The experience control layer 232 also acts as a checkpoint for content validation, story verification, and story logic, in order to provide users with a consistent story experience.

The communication layer 212 performs client-side checks on permissions, content validation, and session management. While the final checks happen at the experience control layer 232 of the back end 230, the additional checks carried out in the communication layer 212 help in providing a consistent experience to the user (e.g. not displaying content or features that cannot be accessed).

The front end 210 also includes the user interface (UI) component 220, which is responsible for displaying and presenting the transmedia content data items to users, including visual, auditory and textual representations, and is also responsible for receiving the user's input through pointing devices, touch events, text input devices, audio commands, live video, or any other kind of interaction. The UI component 218 can adapt to the user's location, environment, or current user state in order to provide an optimized experience.

The visual navigation component 214 is also included in the front end 210, and allows a user to explore, browse, filter and search the transmedia content data items, transmedia content subsets and non-linear networks, and any other content provided by the platform. For navigation in the context of transmedia content and stories, the visual navigation component 214 provides intelligent abstractions and higher-level clusterings of transmedia content data items, transmedia content subsets and non-linear networks, providing the user with an interface for interactive visual exploration of the transmedia content, which enables the user to make navigation choices at a higher-level abstraction before exploring lower levels, down to single stories, i.e. transmedia content subsets, and individual transmedia content data items. The structure of transmedia content subsets and non-linear network and the time-ordered links between transmedia content data items data items is visualized as well, providing the user with information on how these data items are related to each other. In one embodiment of this visualisation, a graph structure is employed, with nodes representing transmedia content data items, and connections representing the time-ordered content links. In the main, the evolution of the transmedia content subsets and non-linear networks is rendered in real-time as the subsets and non-linear networks are created and modified by all users of the system. In addition, in a particular embodiment which is user initiated, for example via user selection or automatically based on user interaction, e.g. immediately or shortly after a given user logs in to the system, the recent past evolution of the transmedia content subsets and non-linear networks, e.g. the evolution since last login of the given user can be displayed graphically, e.g. in a time lapse rendering of the changes of the transmedia content subsets and non-linear networks in the order in which they occurred. The operation of the visual navigation component 214 is described in more detail with respect to FIG. 10 below.

The social interaction component 216 handles visualisations and user input related to interactions between individual users of the system 200. It provides tools for editing a user's public information, enabling notifications on other users creating content ('following'), endorsing and rating other users' content, and directly interacting with other users through real-time messaging systems, discussion boards, and video conferencing. These tools also allow users to collaboratively create new content (i.e. transmedia content data items) and author and edit stories (i.e. transmedia content subsets and/or non-linear networks), as well as define the access rights and permissions associated with such collaborative work. The enforcement of these rights is handled by the experience control layer 232, as mentioned above.

In addition to the experience control layer 232, the back end 230 comprises a user model component 234, a story model component 236, a recommender engine 238, and a metadata extraction component 240, in addition to one or more data stores or computer memory for storing data related to the transmedia content such as the transmedia content data items, linking data, transmedia content subsets, non-linear networks, and metadata relating to the individual data items and linking data as well as to the subsets and non-linear networks.

The user model component 234 represents user behaviour and properties. It is driven by a suite of algorithms and data collections, including but not limited to statistics, analytics and machine learning algorithms operating on user interaction patterns, consumption behaviour and social interactions. The analytics happens in real-time and the user model component 234 is continuously updated as the user interacts with the system 200. Additional information such as the user's geolocation can be taken into account as well. The corresponding data is stored in a user database. The user model component 234 also comprises models for groups of several users, which for example emerge during multiuser collaboration, consumption, geolocation, or social interactions. As part of the user model component 234, users and/or groups of users are profiled and characterized according to their personality, productivity stage and other criteria. The user model component allows the system to make predictions of user behaviour under real or hypothetical conditions, which then feed into the recommender engine component 238. The user model component 234 also permits the correlation of interaction patterns of users not identified to the system so as to re-identify users probabilistically.

The user model component 234 is also connected to the talent harvest component, which, based on user behaviour, identifies individual users or groups of users that fulfil certain criteria such as, for example, having a large amount of users consuming or endorsing their work, having significant influence on other users' behaviours and opinions, or being highly popular personalities. The talent harvest component, in concert with the recommender engine component 238, then influences the behaviour of such users of the system 200.

The story model component 236 characterises the content of single transmedia content data items, transmedia content subsets, non-linear networks and whole story universe, and stores the corresponding data in a story world database. The characterisations are found through algorithms such as, but not limited to, metadata extraction, analytics, graph analysis, or any other algorithms operating on connections between content in general. Metadata extraction extends to include visual, auditory or textual elements, as well as higher-level concepts like characters, character personality traits, actions, settings, and environments. The characterisation also takes into account how users interact with the content, including the analysis of consumption patterns, content ratings and content-related social interaction behaviour. The corresponding updates of the story model component 236 happen in real-time as users interact with the system 200 or as new content is created or existing content is modified. Additionally, the story model component 236 makes use of story, characterisations (including metadata) to model story logic. Using story reasoning, the consistency of individual stories can be verified and logical inconsistencies can be prevented either when a story is created or at the time of consumption. The story model component 236 also communication with the story harvest component, which uses the data provided by the story model component 236 in order to identify and extract content (transmedia media content data items, transmedia content subsets, non-linear networks or higher-level abstractions).

The recommender engine component 238 is in communication with both the story model component 236 and the user model component 234 and provides conceptual connections between the story model component 236 and the user model component 234. The recommender engine component 238 uses data analytics to match content (transmedia content data items, transmedia content subsets, non-linear networks) with users, suggesting users for collaboration, suggesting content to be consumed, or suggesting stories, story arcs or story systems to be extended with new content. Recommendations can be explicit, with recommendations being explicitly labelled as such to the user, guiding the user through a transmedia content subset or non-linear by providing an optimal consumption path or suggesting other users to collaborate with, or they can be implicit, meaning the user's choice is biased towards certain elements of content (including transmedia content, advertisement, users), without making the bias explicitly visible to the user.

The metadata extraction component extracts metadata from transmedia content (i.e. transmedia content data items, transmedia content subsets and/or non-linear networks) automatically, semi-automatically, or manually. The metadata extraction component 240 tags and annotates transmedia content, providing a semantic abstraction not only of the content of individual transmedia content data items, but also of the time-ordered links, transmedia content subsets, non-linear networks, and story systems. The derived metadata thus spans a horizontal dimension (cross-domain, covering different types of media) as well as a vertical one (from single transmedia content data items to whole story systems).

Also depicted in FIG. 3 are story world database 280, media (content) database 282 and user database 284. The databases 280-284 are stored in memory 301 of server device 230. The story world database 280 stores data characterising and defining the structure of the transmedia content subsets, non-linear networks and whole story systems, for example by way of linking data defining the subset structure. Additionally, metadata and graph analytics pertaining to the subsets and networks may also be stored in the story world database 280. The media database 282 stores individual content items, and data characterising the content of individual transmedia content data items, e.g. metadata and graph analytics for the individual content items. The user database 284 stores user data pertaining to users of the system 200, including user behaviour data defining how users have interacted with individual content items and subsets, and user preference data defining user indicated or derived preferences for content items and subsets.

Figure 4:
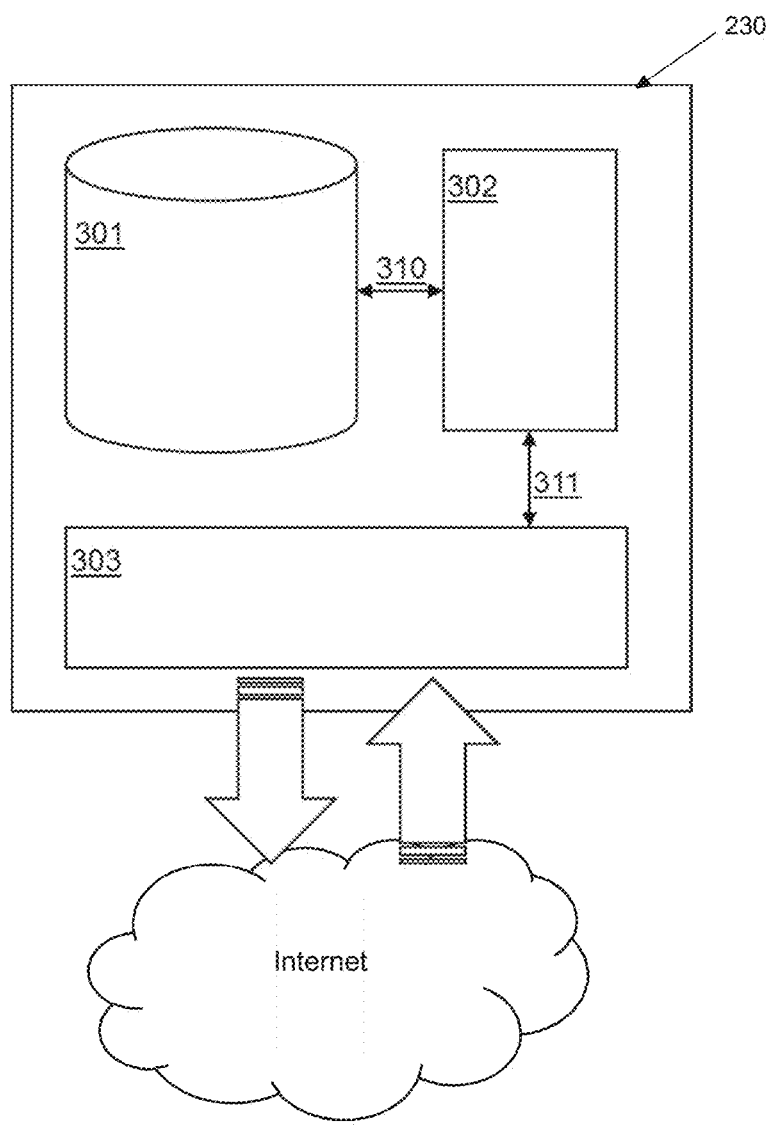
FIG. 4 depicts an exemplary apparatus on which the back end of the present disclosure operates.

FIG. 4 depicts an exemplary server device 230 on which the back end of the system 200 is implemented. It will be appreciated that the back end 230 or functional components thereof may be implemented across several servers or other devices. The server device 230 includes the memory 301, processing circuitry 302 and a network interface 303. The memory may be any combination of one or more databases, other long-term storage such as a hard disk drive or solid state drive, or RAM. As described above, the memory 301 stores the transmedia content data items and associated linking data, which define time-ordered content links between the plurality of transmedia content data items. The plurality of transmedia content data items are arranged into linked transmedia content subsets comprising different groups of the transmedia content data items and different content links therebetween. The processing circuitry 302 is in communication with the memory 301 and is configured to receive instructions from a user device via the network interface to create new time-ordered content links between at least two of the plurality of transmedia content data items and modify 301 the linking data stored in the memory to include the new time-ordered content link.

Figure 5:
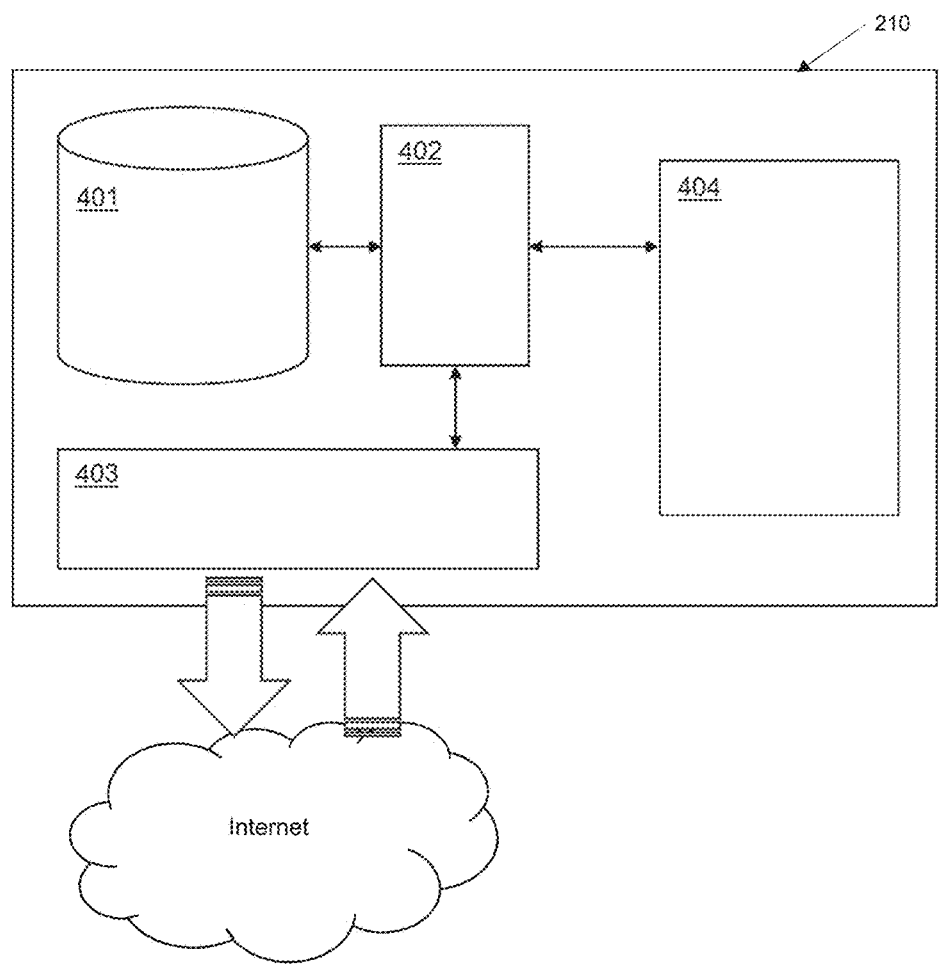
FIG. 5 depicts an exemplary apparatus on which the front end of the present disclosure operates.

FIG. 5 depicts an exemplary user device 210 on which the front end 210 of system 200 is provisioned. The user device 210 includes a memory 401, processing circuitry 402, network interface 403 and a user interface 404. The user interface 404 may comprise one or more of: a touch-sensitive input, such as a touch-sensitive display, a touchscreen, pointing device, keyboard, display device, audio output device, and a tablet/stylus. The network interface 403 may be in wired or wireless communication with a network such as the Internet and, ultimately, the server device 230 depicted in FIG. 4. The electronic device 210 receive user input at the user interface 404 and thereby communicates with the server device 230 via the network interface 403 and network interface 303, which provides the processor 302 with instructions to create new time-ordered content links between the transmedia content data items in the memory 301. The electronic device 210 may also provide instructions to the server device 230 to delete or modify existing time-ordered content links and/or transmedia content data items from the memory.

It will be appreciated that the system may comprise multiple front end electronic devices 210, each configured to receive user input and thereby communicate with the server device 230 and provide instructions to create, delete or modify time-ordered content links between the transmedia content data items. Thus, multiple electronic devices 210, each being accessed by a different user, are adapted to process common content links and content data items which are accessible to The memory 301 of the server device 230 may also store user data items, which are associated with users of the system 200 and comprise user identification data, such as a username, password, email address, telephone number and other profile information. The user data items may also comprise, for each user of the system user preference data pertaining to each user's preferences, user behaviour data pertaining to the each user's online behaviours, user interaction data pertaining to the each user's interaction with other users, and/or user location data pertaining to the current determined and/or past determined location of the each user.

The server device 230 may also be configured to implement the user model 234 of the system 200 as mentioned above. The processing circuitry 302 of the device 230 can use the user model 234 to identify user interactions of the users of the system 200 with the transmedia content data items and subsequently update the user interaction data stored in the memory 301 in accordance with the user interaction.

The memory 301 may also store content characterisation data items, which characterise one or more of the transmedia content data items. In particular, the memory 301 may store auditory characterisation data which characterises auditory components the transmedia content data items, visual characterisation data which characterises visual components of the transmedia content data items, textual characterisation data which characterises textual components of the transmedia content data items and/or interaction characterisation data which characterises interactive components, such as games, or quizzes, or puzzles, of the one or more transmedia content data items. The processing circuitry 303 of the server device 230 can be further configured to provide a content subset modelling engine that processes the content characterisation data items for each transmedia content data item in a given transmedia content subset and generates unique subset characterisation data for the transmedia content subset based on the processed characterisation data. The content subset modelling engine may be provided by the story model component 236 mentioned above.

The processing circuitry 302 may also implement the transmedia content recommender engine 238, mentioned above, which is configured to process the characterisation data items and the user data items for a given user and identify transmedia content data items and surface identification(s) of one or more of the transmedia content data items that are predicted to be matched to users, and additionally can surface identification(s) of other matched users of the system 200.

The processing circuitry 302 of the server device may also be configured to implement the experience control layer 232 mentioned above. The experience control layer 232 implements a permission control system which is used to determine whether a given user has permission to view, edit, modify or delete a given transmedia content data item, time-ordered content like, transmedia content subset or non-linear network. Collaboration is a challenge in itself; however, authorship attribution and consistency in particular are supported. A balance is then provided between a very rigid and tight permission system, which might hinder collaboration and discourage potential contributors from sharing their ideas, and an open system which allows any user to modify or delete the content contributed by other users.

For a given transmedia content subset or non-linear network, created by an original first user (referenced hereinafter as "Alice"), and which consists of individual transmedia content data items connected by time-ordered content links therebetween, this transmedia content subset or non-linear network is attributed to and owned by Alice in metadata associated with the transmedia content data items, linking data and the original transmedia content subset and/or non-linear network exclusively. The experience control layer 232 only allows modifications to the original transmedia content subset or non-linear network by Alice. The system 200 is also configured such that a system administrator user or moderator user can provide or change permissions for and between all individual users, regardless of permissions assigned by individual users.

A second user (referenced hereinafter as "Bob") may wish to contribute to the transmedia content subset or non-linear network. Bob may wish to insert a new transmedia content data item into the transmedia content subset or non-linear network, and/or Bob may wish to create new linking data that defines an alternative path through the non-linear network or transmedia content subset.

The experience control layer 232 does not permit Bob to modify the original transmedia content subset or non-linear network that are attributed to and owned by Alice in the metadata. Instead, the experience control layer 232 instructs the processor 302 to create a copy of the original transmedia content subset or non-linear network in the memory 301, which includes the changes to the transmedia content data items and/or linking data input by Bob.

The copy will be exclusively owned by Bob in the metadata associated with the copied transmedia content subset or non-linear network, and as such the experience control layer 232 will permit only Bob to edit or modify the copied transmedia content subset or non-linear network. However, the original transmedia content data items and linking data contributed by Alice remain attributed to Alice in the metadata, and only the new transmedia content data items and linking data are attributed to Bob in the metadata. The copied transmedia content subset or non-linear network maintains a reference to the original transmedia content subset or non-linear network.

As Bob interacts with the content by creating, modifying and editing content items, subsets and non-linear networks, it updates in real time such that all other users can see the changes as they happen, including Alice.

In an alternative embodiment, Bob can interact with the content by creating, modifying and editing content items, subsets and non-linear networks so that the changes at this stage can only be seen by Bob. When Bob is finished and no longer wishes to modify the content, subsets or non-linear networks, he can formally submit his changes and the experience control layer 232 provides the copied transmedia content subset or non-linear network to the user, more particularly to the user device of the user that is indicated by the metadata of the original transmedia content subset or non-linear network as the owner, e.g. Alice's user device, for review. Alice may then choose to "merge" the copied transmedia content subset or non-linear network with the original. The experience control layer 232 will delete the original and modify the metadata of the copy to indicate that Alice is owner of the copied transmedia content subset or non-linear network, since Bob will have previously been designated in the metadata as owner of any items, subsets or networks which were created or modified by him. The metadata of the individual transmedia content items and linking data, other than the owner, is left unchanged.

Alice may approve of the modifications made by Bob, but may wish keep the modifications as an optional alternative. In this case, she will choose to "branch" the original transmedia content subset or non-linear network. The experience control layer 232 will modify the original transmedia content subset or non-linear network to include any new transmedia content data items and linking data contributed by Bob. The metadata of the individual transmedia content items and linking data is unchanged, and the metadata for the modified original transmedia content subset or non-linear network still identifies Alice as the owner.

Finally, Alice may disapprove of the modification made by Bob, and can choose to "push out" Bob's version. This causes the experience control layer 232 to remove the reference link from the copy to the original. Again, the metadata of the individual transmedia content items and linking data is unchanged. This means that Bob's version of the content items, subset and non-linear networks as a result of his creation and/or modifications are now distinct from Alice's, and exists separately in memory with corresponding metadata to indicate that he is the owner of this version.

The system 200 and experience control layer 232 may allow Alice to fully delete Bob's edit, or force the modification to be hidden from other users of the system. Allowing for this option might be required in some cases, for example when copyright is infringed or the content contributed by Bob is inappropriate.

As mentioned above, the system 200 structures groups of content subsets ("storyworlds"), i.e. non-linear networks, as directed graphs of connected transmedia story data items and storylines, i.e. transmedia content subsets, as sequences of connected transmedia content data items out of the generated non-linear networks graphs.

Figure 6:
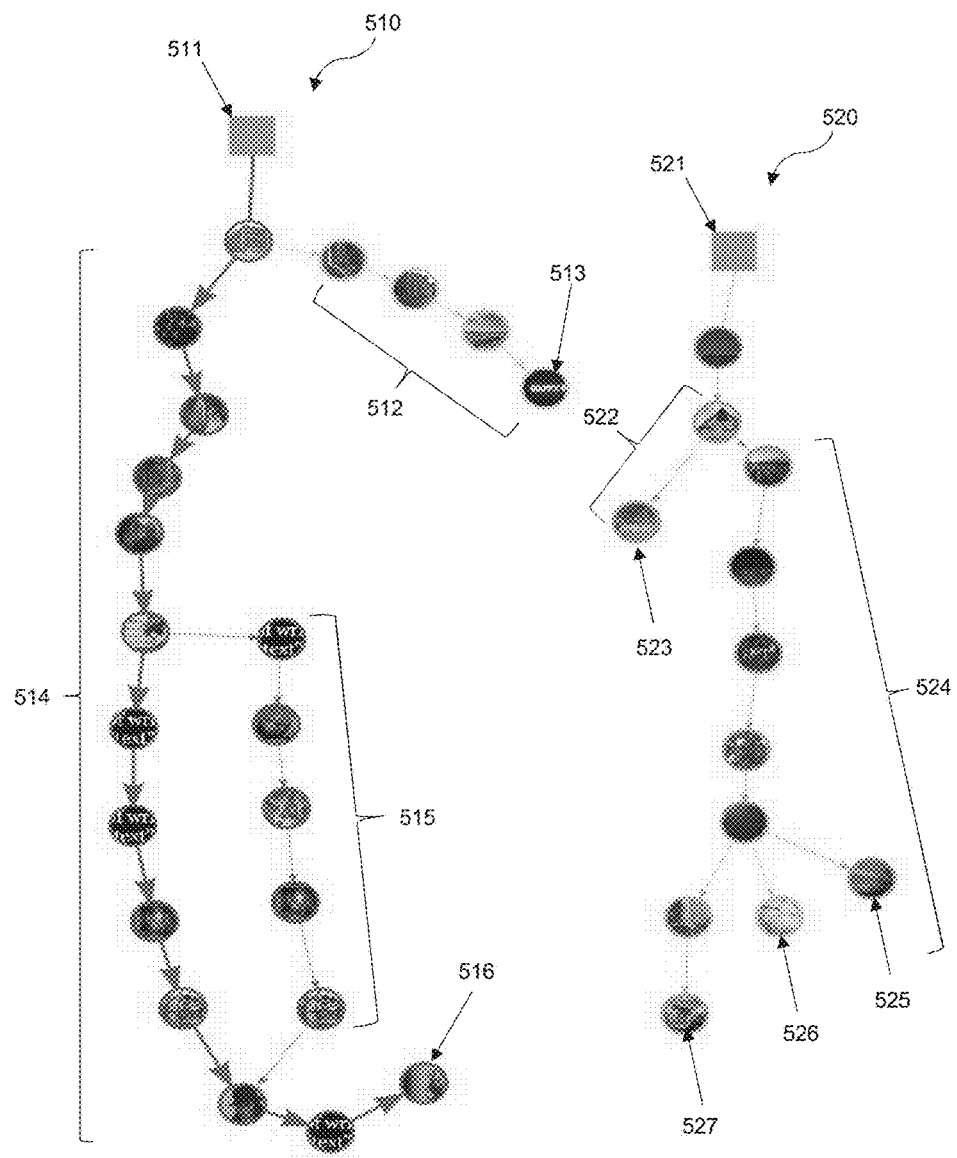
FIG. 6 depicts exemplary non-linear networks of transmedia content data items according to the present disclosure.

The story model component 236 of the system 200 arranges the stories and storyworlds at the transmedia content level based on complex graph metrics. The transmedia content data items are nodes. Edges of the graph define the time-ordered content links between transmedia content data items. The edges and nodes of the graph may be assigned with weights derived from story attributes, e.g. number of likes received by users consuming the story. The graph-based model defines all of the possible consumption flows throughout a given graph and allows identification of transmedia content data items which play key roles within the storyworld. FIG. 6 depicts a graph-model of two non-linear networks of transmedia content data items.

Each depicted non-linear network, 510 and 520 includes at least two subset entry points 511 and 521 which define starting points in the subset (and also any non-linear networks that the subsets are part of) from which the system should begin presenting the transmedia content data items. Non-linear network 511 has two distinct end points 513, 516, which are transmedia content data items that have only incoming time-ordered content links. End point 513 is preceded by a branch 512 of the non-linear network, which shares only its first data item in common with a second brand 514. Branch 514 has an alternate path 515 which skips several of the transmedia content data items of the rest of the branch and then re-joins the branch 515 to terminate at the end point 516. In contrast, non-linear network 520 has four branches with four distinct end points 523, 525, 526 and 527, which share varying numbers of transmedia content data items in common with one another. The data thus generated and stored which is representative of the non-linear network is structural data indicative of the nodes and edges and links therebetween, thereby defining the time-ordered structure of content data items in for the non-linear network.

In a hierarchical system containing a lot of changing content at different levels (story systems, non-linear networks, transmedia content subsets and individual transmedia content data items) users can easily get lost in irrelevant content (for the user) or unappealing content (for the user). An engine guiding the user and fostering the creation of high quality content is thus provided.

As mentioned above, the system 200 further includes a recommender engine component 238. Users of the system, through the recommender engine component 238, receive suggestions about possible story elements, i.e. transmedia content data items, to be consumed and/or extended with new content. Due to the hierarchic nature of the system, recommendations are issued at different levels of granularity, e.g. story system, non-linear networks, transmedia content subsets and individual transmedia content data items. Furthermore, recommendations are dynamic, i.e. they change with continuously evolving content. Recommendations also take into account preferences of the user to keep the user engaged with processing the time-arranged content items. This can mean that individual content items from the same or other users with sufficiently similar or identical content characteristic metadata, e.g. specifying content with sufficiently similar characters, occurring at sufficiently similar or identical factual or fictional times, or in sufficiently similar or identical factual or fictional times, as the characteristic metadata of the content which has already been utilised (consumed) by the user can be surfaced by the recommender engine component 238.

The recommender engine component 238 is configured to access the memory 301 of the server device 230 and surface one or more individual content items and/or linked transmedia content subsets to a user of the system. The surfaced content items or linked transmedia content subsets are chosen by the recommender engine component from the individual transmedia content data items and transmedia content subsets stored in the memory 301. In the present context, "surface" means that the selected one or more item is/are isolated from other items of content and provided to the user, e.g. as a notification on the user device, or as a special flag associated with the surfaced item.

Figure 7:
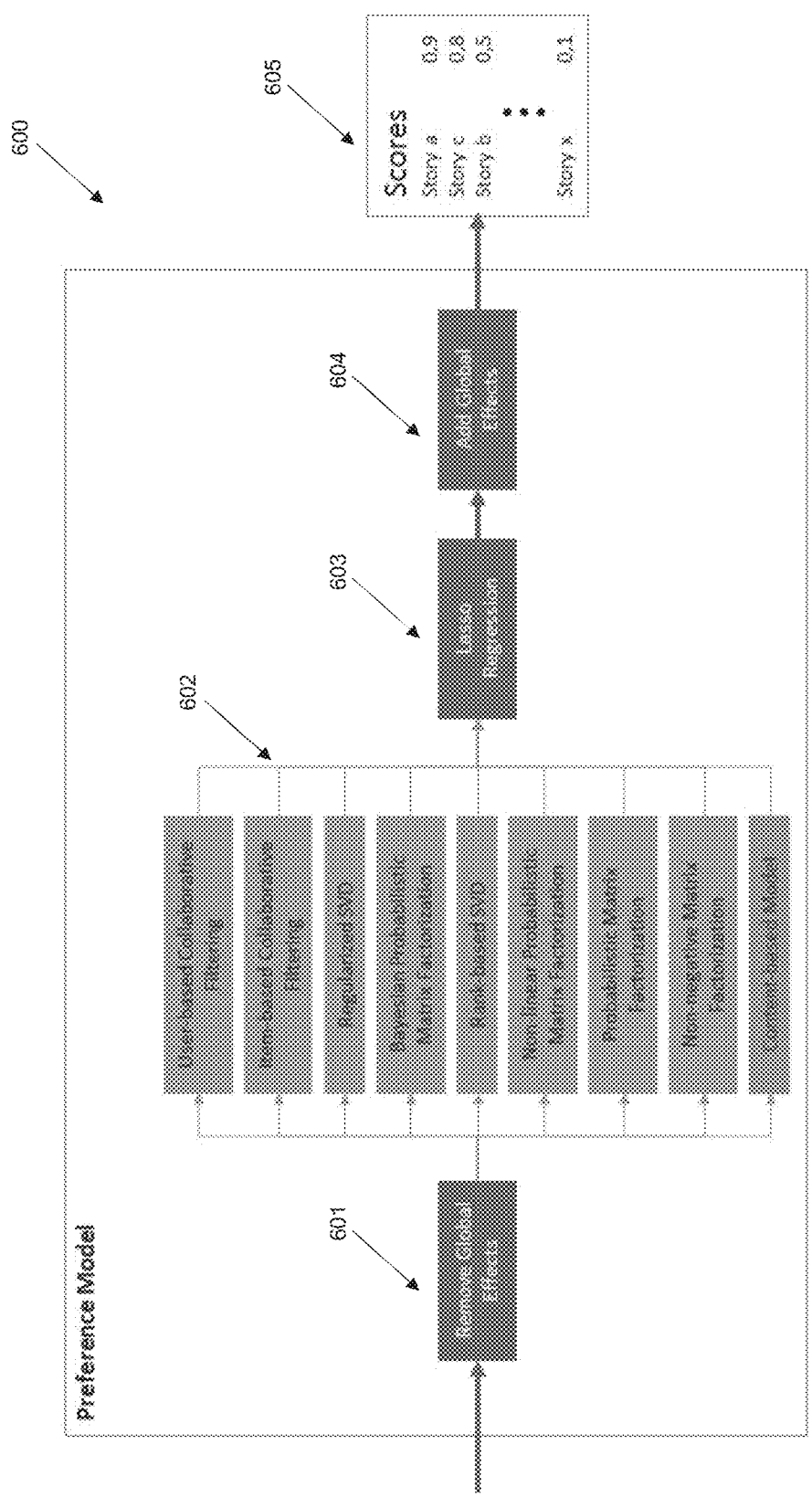
FIG. 7 depicts an exemplary preference model component of the recommender engine component according to the present disclosure.

The recommender engine 238 component may also include a preference model 600 that provides a predicted rating of a given transmedia content data item or transmedia content subset for a specific user of the system 200. The preference model 600 is depicted in FIG. 7. The preference model 600 takes as input one or more transmedia content data items or transmedia content subsets and provides as output predicted rating for each input item for a given user. The preference model 600 achieves this by, at a first step 601, removing global effects. Some users might, for example, tend to constantly give lower ratings than others. Removing this bias before processing the input items improves prediction accuracy. In a second step 602, the model collects the predictions of n independent state of the art algorithms (such as Rank-based SVD). The system then builds an ensemble prediction at step 603 by using a Lasso Regression. In the last step 604, the global effects are added back to the ensemble prediction to obtain the final rating (or score) 605 for the given user.

The recommender engine may also include a user-brand match component, which is configured to provide, for a given user, a prediction of a preference for a given branded content data item, and a branded content model that provides, for a given transmedia content data item, a prediction of the suitability of a given branded content data item, e.g. an advertisement.

The transmedia content recommender engine is configured to query the preference model, user-brand match component and brand model component by providing the preference model, user-brand match component and brand model with a transmedia content parameter, user data for the given user and a given branded content data item, and to maximise the sum of the output for the preference model, user-brand match component and brand model over the transmedia content parameter. This three-dimensional optimisation ensures that users are engaged by relevant, while consuming content containing advertisements of a desired brand.

The transmedia content recommender engine is configured to surface the transmedia content data item or transmedia content subset that has the maximum output of the three-dimensional optimisation.

The recommender engine component 238 may also take into account a given user's defined preferences, and other predicted properties such as user behaviour, or emotional state. In order to achieve this, the recommender engine component 238 communicates with the user model component 234 depicted in FIG. 3 and shown in more detail in FIG. 8. The user model component 238 includes a state model 701, behaviour model 702, user profile 703, interaction model 704 and talent harvest component 705.

Modelling the state of the user, using state model component 701 permits personalised recommendations to be provided by the recommender engine component 238, and also provides accurate predictions of user behaviour by the behaviour model component 702. The state model component 701 may also be used to customise the user interface 218 and encourage users to create new content, i.e. new transmedia content data items and time-ordered content links, within the system 200. The state model component 701 represents and predicts the continuous creational, emotional and affective state of users of the system 200. The creational state describes if the user is in the mood for consuming transmedia content subsets or non-linear networks or contributing their own transmedia content data items and time-ordered content links. The affective state indicates whether the user is, for example, motivated or bored. The emotional state describes the emotions that individual transmedia content data items or transmedia content subsets/non-linear networks trigger in the user.

Due to the hierarchy of the system, i.e. the logical separation of transmedia content into levels of the individual transmedia content data items, transmedia content subsets, non-linear networks and story universe, user behaviour is predicted at different levels of granularity in two main dimensions, namely: (1) the transmedia content hierarchy; and (2) the interaction of users with other users. User dynamics are of interest at different levels of user granularity, for example in respect of: single users, small groups, audiences. The behaviour model component 702 predicts the user behaviour in both of these dimensions and provides insights into dynamic behaviour for load balancing, information about the most likely path of a user through a given non-linear network and predicts the evolution of the whole system 200.

The user preference component 703 provides a detailed profiling for each user of the system 200, including, for example, demographics (e.g. age, gender, etc.), personality traits (e.g. Big 5) and location data (GPS).

The interaction model component 704 monitors and predicts social interactions of users. The analysis and prediction of social interactions of groups of contributors can be used by the system 200 to encourage collaboration across all levels of the system, predict the quality of stories and influence user community building.

Talent harvest component 705 identifies users of the system 200 with exceptional talent at creating transmedia content, and categorises these users according to their type of talent, e.g. a Star Wars expert, an artist doing funny comic strips or a user resonating with a specific audience.

Figure 8:
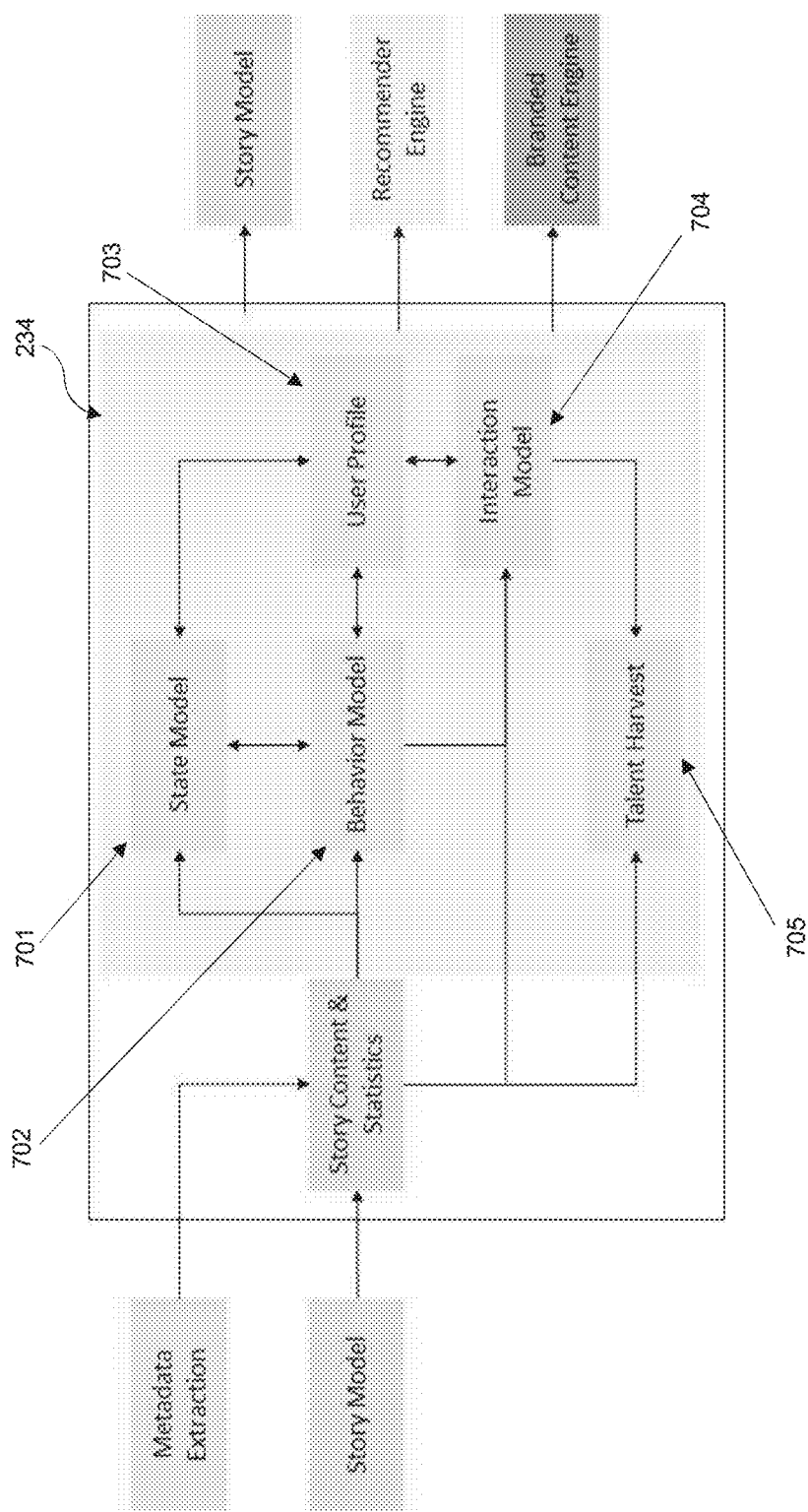
FIG. 8 depicts a user model component of the system.

As shown in FIG. 8, the user model component 234 is in communication with the story model component 236, the recommender engine component 238 and the metadata extraction component 240, with these components being both inputs and outputs to the user model component 234, allowing data exchange therebetween.

Navigating through a large quantity of transmedia content data items, transmedia content subsets and non-linear networks that are provided to users by the system 200, in a way that users and user groups can create and consume the data quickly on a range of devices, including personal computers, laptops, tablets, mobile devices etc. is challenging. The user interface component 218 guides the user in a non-disruptive way, whilst also avoiding repetitive meandering and visual overload of content creation and navigation tools on the multiple, hierarchical levels of the transmedia content.

The user interface component 218 presents the transmedia content data items, transmedia content subsets and non-linear networks as follows. A three-dimensional representation is utilised based on one or more three-dimensional shapes which can be manipulated by the user. In a two-dimensional system involving a two-dimensional display screen, a two-dimensional representation of the three-dimensional shape(s) is/are generated, and the shape(s) utilised may be one or more spheres or ellipsoids, which use hierarchically-connected visual metaphors to provide further information on the transmedia content data items and how they are related and connected in a time-based manner for users and groups of users. This is achieved in a non-disruptive and non-distracting manner. It will be appreciated that any three-dimensional object may be used to present the transmedia content. In one embodiment of the present invention, the visual metaphors can equate to features of a planet, such as continental landmasses, oceans, clouds, mountain ranges and coastlines.

Figure 9B:
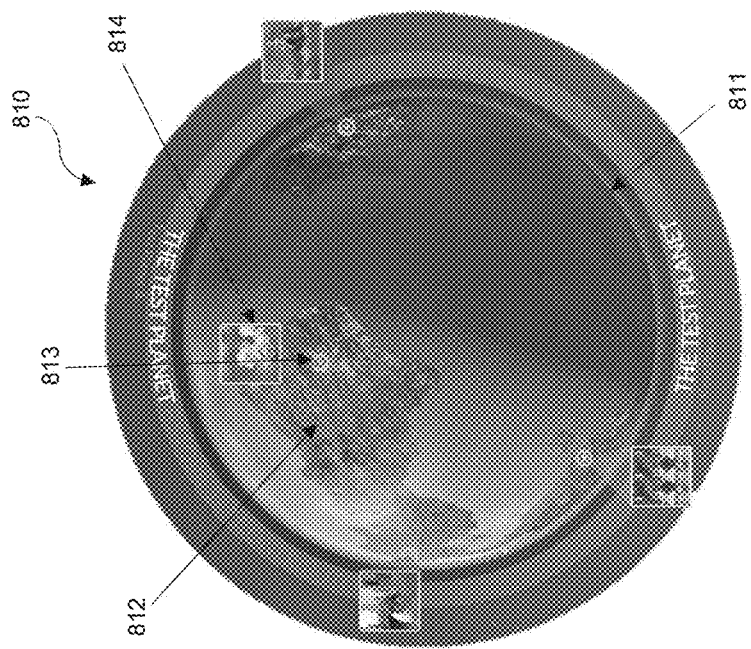
FIGS. 9A and 9B depict exemplary user interfaces that are rendered and output by the system.
Figure 9A:
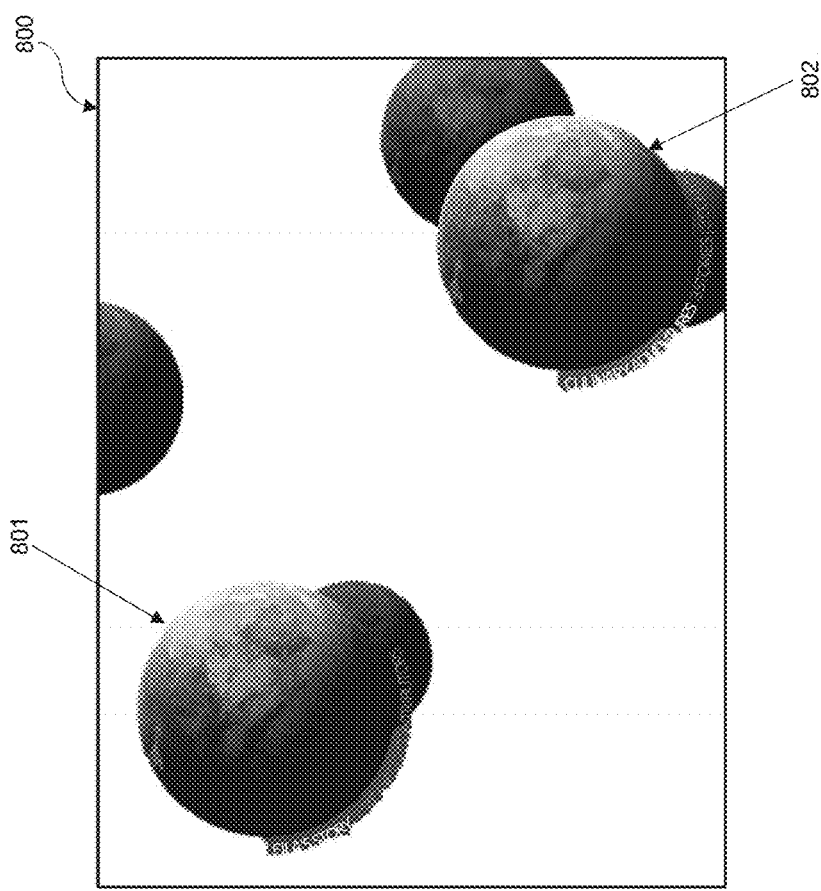

FIGS. 9A and 9B depict an example of the user interface that is presented to a user of the system 200 at different levels of the hierarchical structure. FIG. 9A depicts a higher-level view of the transmedia content 800 which depicts several spheres 801, 802. Each sphere 801, 802 represents a storyworld, i.e. groups of transmedia content subsets and non-linear networks that are semantically similar, e.g. the constituent transmedia content data items relate to the same story characters or story universe. The spheres themselves may be visually clustered together in the displayed three-dimensional representation according to semantic similarity between the storyworlds.

A user may select one of the spheres 801, 802, which causes the user interface 800 to transition to a modified user interface 810, which depicts the selected single sphere 811 with additional detail. Additional surface features of the selected sphere 811 are displayed in user interface 810, such as individual transmedia content subsets or non-linear networks indicated by icons 813, and representative images of the content 814. The visual metaphors are provided such that semantically similar transmedia content subsets and non-linear networks are depicted on the same continents 812 on the surface of the planet 811. When a user wishes to consume or edit an individual transmedia content subset or non-linear network, the user can select one of the icons 813 or images 814 and the user interface 810 transitions to show a graph-structure of the subset/network and/or the individual transmedia content data items.

Figure 10:
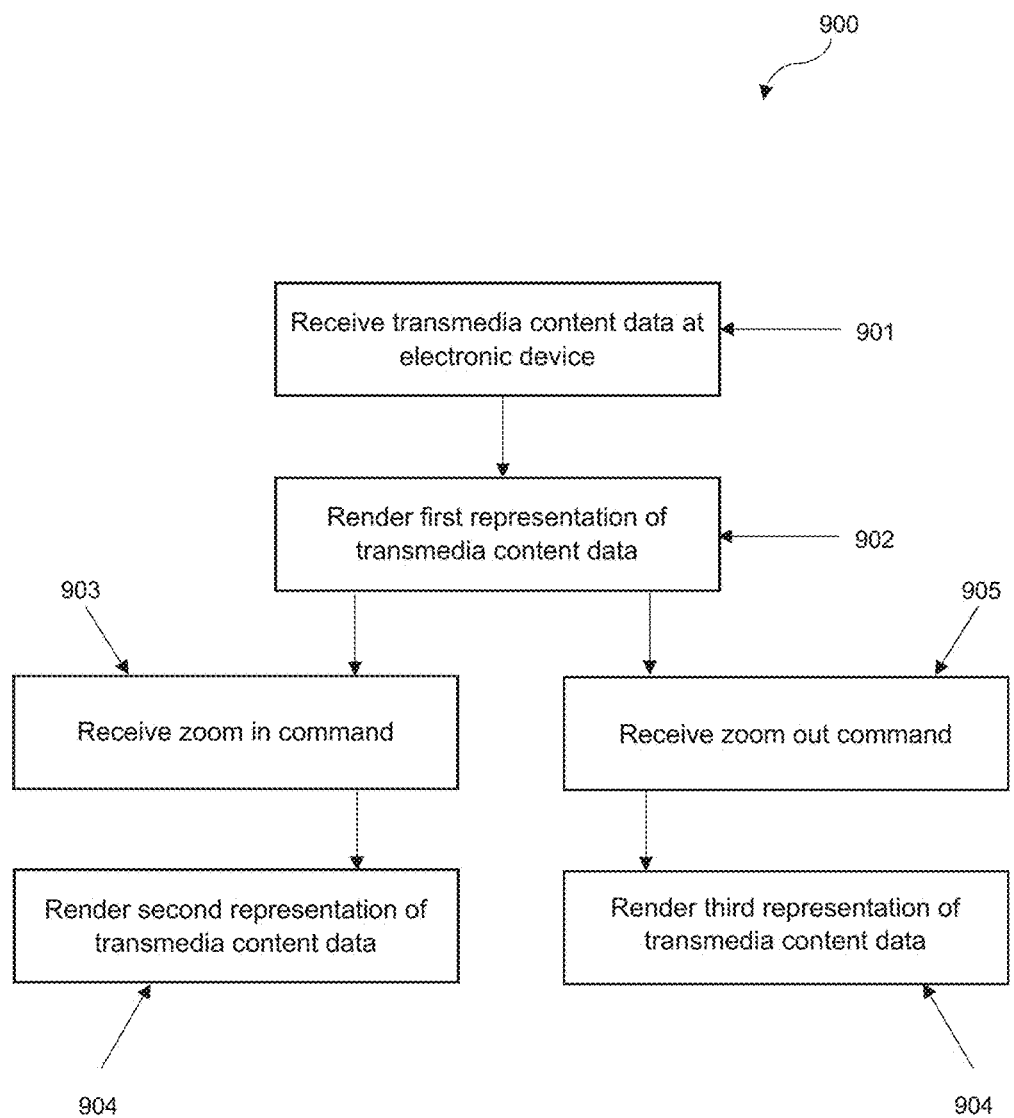
FIG. 10 depicts a process for rendering a representation of and interacting with transmedia content on an electronic device.

To this end, the system 200 implements a method 900, depicted in FIG. 10, at the front end electronic device 210, for rendering a representation of and interacting with transmedia content on an electronic device.

At step 901, the electronic device 210 received, via the network interface 403, transmedia content data at the electronic device comprising a plurality of transmedia content data items, linking data which define time-ordered content links between the plurality of transmedia content data items, a visualisation model of the transmedia content data and a hierarchical structure of the linked transmedia content subsets and clusters of linked transmedia content subsets. The plurality of transmedia content data items are arranged into linked transmedia content subsets comprising different groups of the transmedia content data items and different content links therebetween.

At step 902, the electronic device renders a first representation of the transmedia content data by processing the visualisation model of the transmedia content data and the hierarchical structure to map some or all of the transmedia content at a first level of the hierarchical structure onto the representation of the transmedia content. The rendered first representation of the transmedia content data may then be output by the electronic device 210 on display 404.

At step 903, the electronic device 210 receives, via a user input interface of the electronic device such as the display 404, which may be a touch screen device, an input command indicative of a zoom request to zoom into an element of the tree-structure displayed in the representation of the transmedia content data. The user input may be one of: a gesture, a swipe, a tap, a press, and a hold.

Subsequently, at step 904, the electronic device 210 renders a second representation of the transmedia content data by processing the visualisation model and the hierarchical structure, in which some or all child elements of the zoomed element of the hierarchical structure are displayed.

Alternatively to step 903, if a zoom out command is received at the electronic device 210 at step 905, the electronic device 210 renders a third representation of the transmedia content data by processing the visualisation model and the hierarchical structure at step 906. Some or all of the elements at a higher level of the hierarchical structure are displayed are displayed in the third representation.

It will be appreciated that steps 903 to 906 may be carried out by the electronic device whenever the zoom in or zoom out commands are received, i.e. steps 905 and 906 may also take place subsequently to steps 903 and 904, and conversely steps 903 and 904 may be carried out subsequently to steps 905 and 906.

The method 900 may further comprise, prior to steps 904 and/or 906, a step of rendering a smooth transition between the first representation and second or third representation.

The hierarchical structure that is part of the transmedia content data is a structure arranged in memory that represents the hierarchy of elements set out in FIGS. 2A to 2C, with elements of the lowest level of the tree structure being transmedia content data items, the elements of the second-lowest level being linked transmedia content subsets describing a group of content items with time ordered links between the transmedia content data items of the child elements, and the elements of third-lowest level being clusters of sufficiently similar transmedia content subsets. The hierarchical structure may comprise further, higher levels that relate to clusters of non-linear networks and story universes. The hierarchical structure can be formed as a hierarchical tree structure comprising one or more branched time-ordered content links linking the content items which form one or more of the subsets. There can be one or more branched links at one or more of the transmedia content items within the subset.

The layout data, which also forms part of the transmedia content data, is generated by the back-end 230 of the system 200. The layout data is generated such that at a first level, grouped clusters of transmedia content subsets are represented as a three-dimensional object. At a second level, each cluster of linked transmedia content subsets is represented as an area on the surface of the three dimensional object. At a third level, each linked transmedia content subset is represented by a sub-area within the area of the parent tree element on the surface of the planet, and at a fourth level, each transmedia content data item is represented by a point within the sub-area of the parent tree element on the surface of the three dimensional object.

At step 904, when a specific element is zoomed in to, a lower level of the layout data than the currently displayed level is displayed in the second representation of the transmedia content data. Similarly, at step 906, when a command to zoom out is received, a higher level of the layout data than the current level is displayed in the third representation of the transmedia content data.

At the lowest level representation of the transmedia content model, one or more subset entry points are displayed, which a user may select in order to being consuming the transmedia content data items that follow the time-ordered content links from the subset entry point.

To this end, the electronic device 210 may receive, via the input interface, an input command indicative of a selection of a subset entry point and subsequently render a representation of the one or more linked transmedia content subsets of which the subset entry point is a member.

The currently output representation of the transmedia content data may also change when the transmedia content data itself changes. The electronic device 210 may receive a transmedia content data update, which contains delta updates with respect to the previously received transmedia content data. The electronic device 210 may then render an updated representation of the transmedia content data by processing the transmedia content data update and output the updated representation on the display 404.

When updates to the transmedia content data are expected but not received by the electronic device 210, perhaps due to network packet loss or latency, the electronic device 210 may interpolate a state of the transmedia content data based on previously received transmedia content data and/or transmedia content data updates to generate interpolated transmedia content data. Subsequently, the electronic device renders an interpolated representation of the transmedia content data by processing the interpolated transmedia content data and outputs the interpolated representation on the display 404.

In addition to providing a representation of the transmedia content data that can be interacted with by the user, the system 200 may provide additional user interface elements that allow users of the system 200 to interact with one another, such as rendering and outputting a chat window containing message data items alongside the first, second or third representation.

The message data items that are displayed in the chat window are associated with the level of the hierarchical structure that is displayed in the currently output representation, and the message data items that are displayed in the chat window change when the currently output representation changes.

Figure 11:
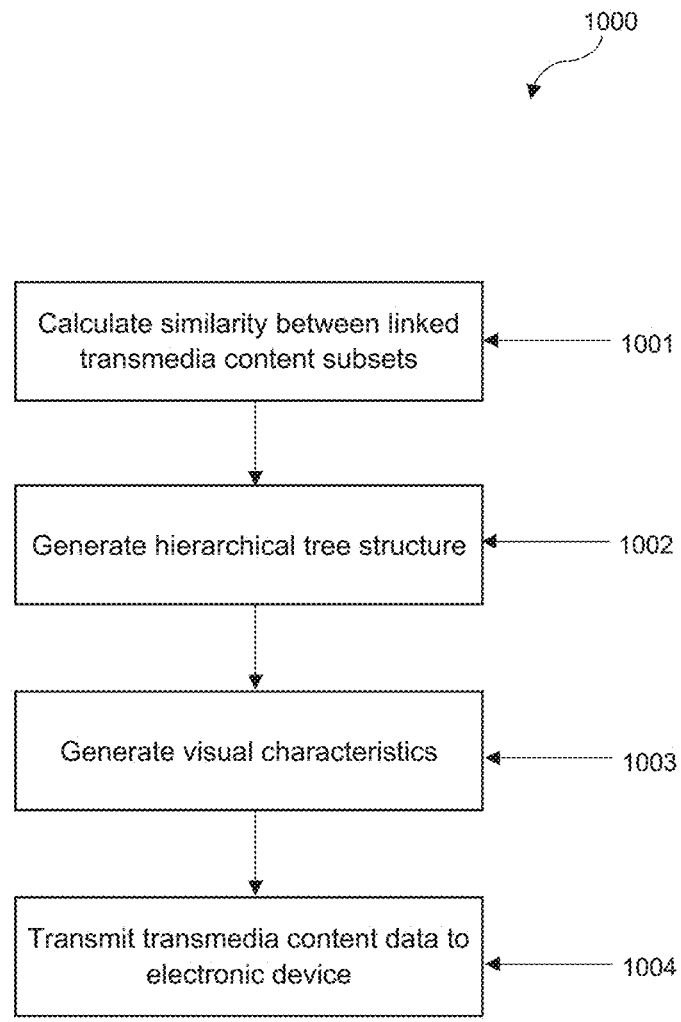
FIG. 11 depicts a back end process for sorting and processing a plurality of transmedia content data items.

At the back-end 230 of the system 200, the server device 230 implements a method 1000, as shown in FIG. 11, for sorting and processing a plurality of transmedia content data items to generate the transmedia content data that is transmitted to the electronic device 210.

The plurality of transmedia content data items are stored in the memory 301 of the server device 230 and are arranged into linked transmedia content subsets comprising different groups of the transmedia content data items and different time-ordered content links therebetween.

At step 1001, the server device 230 calculates a similarity between linked transmedia content subsets by, for example, comparing the number of transmedia content data items and time-ordered content links that the transmedia content subsets have in common.

At step 1002, the server device 230 generates a hierarchical structure of linked transmedia content subsets and clusters of linked transmedia content subsets based, for example, on the calculated similarity.

At step 1003, for each linked transmedia content subset and each cluster of transmedia content subsets in the hierarchical structure, the server device 230 generates visual characteristics based on the characteristics of the linked transmedia content subset or cluster of linked transmedia content subsets, and generates a visualisation model of the transmedia content based on the hierarchical structure and the visual characteristics.

In one embodiment of the invention, the visual characteristics and visualisation data use a planet metaphor to provide information about and present the transmedia content data items to users. For example, the size of a continent on the surface of the planet is based on the number of transmedia content subsets or non-linear networks in the cluster. The distance from visually important regions and the irregularity of the shape of the continent may be based on the number of likes, view, or other endorsements of the transmedia content data items represented on the continent. If the transmedia content data items in a cluster have a high number of endorsements, the continent may be positioned near the equator and the front area of the sphere, and it has more irregular boundaries based on the graph structure rather than a circular shape. The similarity between clusters of subsets and non-linear networks may determine how close two continent s are on the surface of the planet. At the levels described above, with respect to FIG. 10, different features on the surface of the planet may be displayed at different zoom levels, in different representations.

At step 1004, the server device 230 transmits the transmedia content data, which comprises the plurality of transmedia content data items, linking data which define the time-ordered content links between the plurality of transmedia content data items, the visualisation model, and the hierarchical structure to the electronic device 210.

When the transmedia content data stored in the memory 301 of the server device 230 changes, the method 1000 may further comprises steps of updating the hierarchical structure, visual characteristics and transmedia content model based on the changes to one or more of the transmedia content data items and/or one or more of the linked transmedia content subsets. The server device 230 then generates a delta update based on updated hierarchical structure, transmedia content model, transmedia content data items and/or linked transmedia content subsets and transmits the delta update to the electronic device.

Figure 12:
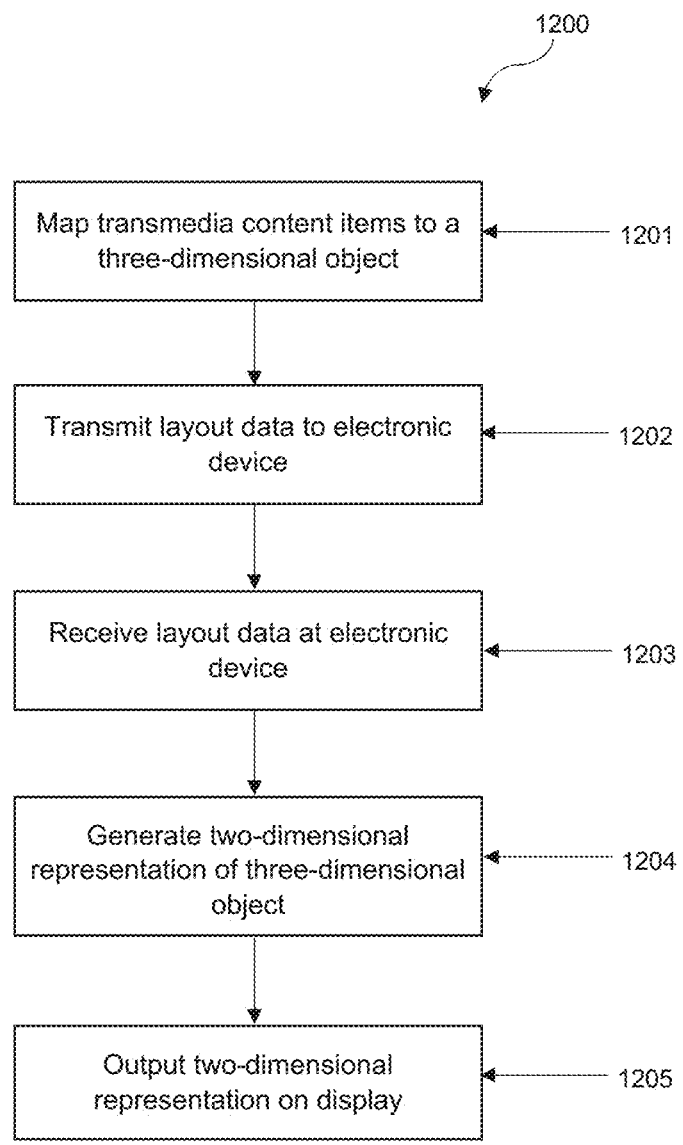
FIG. 12 depicts a process for mapping transmedia content data items onto a three-dimensional object according to the present disclosure.

FIG. 12 depicts a method 1200 for mapping transmedia content data items onto a three-dimensional object which is used to render a two-dimensional representation to be output on a display, as discussed above. At step 1201, which is carried out at a computing device, e.g. server device 230, linked transmedia content data items are mapped to a three-dimensional object defined by layout data. At step 1202, the layout data is transmitted via the network interface 303 to an electronic device, e.g. user device 210, to be processed and output on a display 404 associated with the device 210. At step 1203, the electronic device 210 receives the layout data via network interface 403 from the server device. At step 1204, the processing circuitry 402 of electronic device 210 generates a two-dimensional representation of the three-dimensional object for display on the display 404 associated with the electronic device 210, as described above. At step 1205, the electronic device 210 outputs the two-dimensional representation on the display 404 associated with the electronic device 210.

While some exemplary embodiments of the present disclosure have been shown in the drawings and described herein, it will be appreciated that the methods described herein may be deployed in part or in whole through a computing apparatus that executes computer software, program codes, and/or instructions on processing circuitry, which may be implemented by or on one or more discrete processors. As a result, the claimed electronic device, apparatus and system can be implemented via computer software being executed by the processing circuitry. The present disclosure may be implemented as a method in a system, or on an apparatus or electronic device, as part of or in relation to the apparatus or device, or as a computer program product embodied in a computer readable medium executable on one or more apparatuses or electronic devices.

A processor as disclosed herein may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. Each processor may be realized as one or more microprocessors, microcontrollers, embedded microcontrollers, programmable digital signal processors or other programmable device, along with internal and/or external memory. A given processor may also, or instead, be embodied as an application specific integrated circuit, a programmable gate array, programmable array logic, or any other device or combination of devices that may be configured to process electronic signals. In addition, each processor may enable execution of multiple programs, threads, and codes. The threads may be executed simultaneously to enhance the performance of the processor and to facilitate simultaneous operations of the application. By way of implementation, the methods, program codes, program instructions and the like described herein may be implemented in one or more thread. The thread may spawn other threads that may have assigned priorities associated with them; the processor may execute these threads based on priority or any other order based on instructions provided in the program code.

Each processor may access one or more memories, for example one or more non-transitory storage media which store the software, executable code, and instructions as described and claimed herein. A storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

The methods and/or processes disclosed herein, and steps associated therewith, may be realized in hardware, software or a combination of hardware and software suitable for a particular application. The hardware may include a general purpose computer and/or dedicated computing device or specific computing device or particular aspect or component of a specific computing device.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, the methods described above and combinations thereof may be embodied in computer executable code that, when executing on one or more computing devices, performs the steps thereof. In another aspect, the methods may be embodied in a system that performs the steps thereof, and may be distributed across electronic devices in a number of ways, or all of the functionality may be integrated into a dedicated, standalone electronic device or other hardware. In another aspect, the means for performing the steps associated with the processes described above may include any of the hardware and/or software described above.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising", "having", "including", and "containing" are to be construed as open-ended terms (i.e. meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g. "such as") provided herein, is intended merely to better illuminate the disclosure and does not pose a limitation on the scope of the disclosure unless otherwise claimed.

The present disclosure has been provided above by way of example only, and it will be appreciated that modifications of detail can be made within the scope of the claims which define aspects of the invention.

The invention claimed is:

1. A computer-implemented method for rendering a representation of and interacting with transmedia content on an electronic device, the method comprising the following steps:
   receiving transmedia content data at the electronic device, the transmedia content data comprising:
   a plurality of transmedia content data items;
   linking data which define time-ordered content links between the plurality of transmedia content data items, the plurality of transmedia content data items being arranged into linked transmedia content subsets comprising different groups of the transmedia content data items and different content links therebetween;
   a visualization model of the transmedia content data; and
   a hierarchical structure of the linked transmedia content subsets presented as a visual metaphor, wherein the hierarchical structure is arranged in memory with elements of a lowest level of the hierarchical structure being transmedia content data items, elements of a second-lowest level being linked transmedia content subsets describing time ordered links between the transmedia content data items of child elements, and elements of a third-lowest level being clusters of sufficiently similar linked transmedia content subsets and clusters of linked transmedia content subsets; and
   rendering, at the electronic device, a first representation of the transmedia content data by processing the visualization model of the transmedia content data and the hierarchical structure to map some or all of the transmedia content at a first level of the hierarchical structure onto the representation of the transmedia content, wherein layout data for the visualization model is generated such that:
      at a first level, grouped clusters of transmedia content subsets are represented as a three-dimensional object,
      at a second level, each cluster of linked transmedia content subsets is represented as an area on a surface of the three dimensional object,
      at a third level, each linked transmedia content subset is represented by a sub-area within an area of a parent tree element on a surface of a planet, and
      at a fourth level, each transmedia content data item is represented by a point within the sub-area of the parent tree element on the surface of the three dimensional object.

2. The method of claim 1, wherein the hierarchical structure is a hierarchical tree structure comprising one or more branched time-ordered content links at one or more of the transmedia content items.

3. The method of claim 1, further comprising the following steps:
   receiving, via a user input interface of the electronic device, an input command indicative of a zoom request to zoom into an element of the hierarchical structure displayed in the representation; and
   rendering, at the electronic device, a second representation by processing the visualization model and the hierarchical structure, in which some or all child elements of the zoomed element of the hierarchical structure are displayed.

4. The method of claim 3, wherein the user input interface is a touch screen display, and wherein the user input is one of: a gesture, a swipe, a tap, a press, and a hold.

5. The method of claim 3, wherein the user input interface is a pointing device, and wherein the user input is one of: a scroll or one or more clicks.

6. The method of claim 3, wherein the method further comprises the step of rendering a smooth transition between the first representation and the second representation or a third representation.

7. The method of claim 3, wherein in the first representation one or the first, second or third levels of the layout data are displayed, and wherein in the second representation, a lower level of the layout data is displayed.

8. The method of claim 1, further comprising the following steps:
   receiving, via a user input interface of the electronic device, an input command indicative of a zoom request to zoom out of a current element of the hierarchical structure displayed in the representation; and
   rendering, at the electronic device, a third representation by processing the visualization model and the hierarchical structure, wherein some or all of the elements at a higher level of the hierarchical structure are displayed in the third representation.

9. The method of claim 8, wherein in the first representation one or the second, third or fourth levels of the layout data are displayed, and wherein in the third representation, a higher level of the layout data is displayed.

10. The method of claim 1, wherein the transmedia content data items relate to narrative elements of the transmedia content data items.

11. The method of claim 10 wherein the time-ordered content links define a narrative order of the transmedia content data items.

12. The method of claim 1, wherein each time-ordered content link defines a directional link from a first transmedia content data item to a second transmedia content data item of the plurality of transmedia content data items.

13. The method of claim 12, wherein the first transmedia content data item has a plurality of outgoing time-ordered content links.

14. The method of claim 12, wherein the second transmedia content data item has a plurality of incoming time-ordered content links.

15. The method of claim 12, wherein the memory is further configured to store a plurality of subset entry points for a plurality of transmedia content subsets.

16. The method of claim 15, wherein each subset entry point is a flag indicating a transmedia content data item that has at least one outgoing time-ordered link and no incoming time-ordered links.

17. The method of claim 16, wherein each linked transmedia content subset defines a linear path, wherein a linear path comprises a subset entry point, one or more transmedia content data items and one or more time ordered links between the subset entry point and the transmedia content data items.

18. The method of claim 17, wherein two or more transmedia content subsets share one or more subset entry points, one or more transmedia content data items and/or one or more time ordered content links.

19. The method of claim 15, wherein, at the lowest level representation of the transmedia content model, one or more subset entry points are displayed.

20. The method of claim 19, further comprising the steps of:
receiving, via a user input interface of the electronic device, an input command indicative of a selection of a subset entry point; and
rendering, at the electronic device, a representation of the one or more linked transmedia content subsets of which the subset entry point is a member.

21. The method of claim 1, further comprising the steps of:
receiving a transmedia content data update, wherein the transmedia content data update contains delta updates with respect to the previously received transmedia content data; and
rendering, at the electronic device, an updated representation of the transmedia content data by processing the transmedia content data update.

22. The method of claim 21, further comprising the steps of:
interpolating a state of the transmedia content data based on previously received transmedia content data and/or transmedia content data updates to generate interpolated transmedia content data; and
rendering, at the electronic device, an interpolated representation of the transmedia content data by processing the interpolated transmedia content data.

23. The method of claim 1, wherein the visualization model is a three-dimensional model representing the transmedia content data items, linked transmedia content subsets and clusters of linked transmedia content subsets in the hierarchical structure.

24. The method of claim 23, wherein the representation of the transmedia content data is a two-dimensional representation of a part of the three-dimensional model.

25. The method of claim 1, wherein each transmedia content data item is a story element.

26. The method of claim 1, further comprising rendering and outputting a chat window containing message data items alongside the first representation, a second representation or a third representation.

27. The method of claim 26, wherein the message data items displayed in the chat window are associated with the level of the hierarchical structure that is displayed in a current currently output representation.

28. The method of claim 27, wherein the message data items that are displayed in the chat window changes when the current output representation changes.

29. A computer-implemented method for sorting and processing a plurality of transmedia content data items, the plurality of transmedia content data items being arranged into linked transmedia content subsets comprising different groups of the transmedia content data items and different time-ordered content links therebetween, the method comprising the following steps:
calculating similarity between linked transmedia content subsets;
generating a hierarchical structure of linked transmedia content subsets and clusters of linked transmedia content subsets based on the calculated similarity;
for each linked transmedia content subset and each cluster of transmedia content subsets in the hierarchical structure, generating visual characteristics based on the characteristics of the linked transmedia content subset or cluster of linked transmedia content subsets presented as a visual metaphor, wherein the hierarchical structure is arranged in memory with elements of a lowest level of the hierarchical structure being transmedia content data items, elements of a second-lowest level being linked transmedia content subsets describing time ordered links between the transmedia content data items of child elements, and elements of a third-lowest level being clusters of sufficiently similar linked transmedia content subsets;
generating a visualization model of the transmedia content based on the hierarchical structure and the visual characteristics;
transmitting, to an electronic device, transmedia content data comprising:
the plurality of transmedia content data items,
linking data which define the time-ordered content links between the plurality of transmedia content data items,
the visualization model, wherein layout data for the visualization model is generated such that:
at a first level, grouped clusters of transmedia content subsets are represented as a three-dimensional object,
at a second level, each cluster of linked transmedia content subsets is represented as an area on a surface of the three dimensional object,
at a third level, each linked transmedia content subset is represented by a sub-area within an area of a parent tree element on a surface of a planet, and
at a fourth level, each transmedia content data item is represented by a point within the sub-area of the parent tree element on the surface of the three dimensional object, and
the hierarchical structure.

30. The method of claim 29, wherein the hierarchical structure is a hierarchical tree structure comprising one or more branched time-ordered content links at one or more of the transmedia content items.

31. The method of claim 29, wherein the visualization model comprises a three-dimensional model on which the elements of the hierarchical structure are organized.

32. The method of claim 29 wherein the step of generating a visualization model comprises generating a layout of a three-dimensional model based on characteristics of the transmedia content data items, linked transmedia content subsets and clusters of linked transmedia content subsets in the hierarchical structure.

33. The method of claim 29, further comprising the following steps:
updating the hierarchical structure, visual characteristics and transmedia content model based on changes to one or more of the transmedia content data items and/or one or more of the linked transmedia content subsets;
generating a delta update based on updated structure, transmedia content model, transmedia content data items and/or linked transmedia content subsets; and
transmitting the delta update to the electronic device.

34. An electronic device comprising a memory and processing circuitry, wherein the processing circuitry is configured to perform the steps of:
receiving transmedia content data at the electronic device, the transmedia content data comprising:
a plurality of transmedia content data items;
linking data which define time-ordered content links between the plurality of transmedia content data items, the plurality of transmedia content data items being arranged into linked transmedia content subsets comprising different groups of the transmedia content data items and different content links therebetween;
a visualization model of the transmedia content data; and
a hierarchical structure of the linked transmedia content subsets presented as a visual metaphor, wherein the hierarchical structure is arranged in memory with elements of a lowest level of the hierarchical structure being transmedia content data items, elements of a second-lowest level being linked transmedia content subsets describing time ordered links between the transmedia content data items of child elements, and elements of a third-lowest level being clusters of sufficiently similar linked transmedia content subsets and clusters of linked transmedia content subsets; and
rendering, at the electronic device, a first representation of the transmedia content data by processing the visualization model of the transmedia content data and the hierarchical structure to map some or all of the transmedia content at a first level of the hierarchical structure onto the representation of the transmedia content, wherein layout data for the visualization model is generated such that:
at a first level, grouped clusters of transmedia content subsets are represented as a three-dimensional object,
at a second level, each cluster of linked transmedia content subsets is represented as an area on a surface of the three dimensional object,
at a third level, each linked transmedia content subset is represented by a sub-area within an area of a parent tree element on the surface of a planet, and
at a fourth level, each transmedia content data item is represented by a point within the sub-area of the parent tree element on the surface of the three dimensional object.

* * * * *

UNITED STATES PATENT AND TRADEMARK OFFICE
CERTIFICATE OF CORRECTION

PATENT NO. : 10,331,726 B2  
APPLICATION NO. : 15/276506  
DATED : June 25, 2019  
INVENTOR(S) : Rebekkah Laeuchli et al.

Page 1 of 1

It is certified that error appears in the above-identified patent and that said Letters Patent is hereby corrected as shown below:

In the Claims

Column 25, Claim 21, Line 44:
Replace "with respect to the previously received transmedia" with --with respect to previously received transmedia--

Column 26, Claim 27, Line 8:
Replace "current currently output representation" with --current output representation--

Signed and Sealed this  
Third Day of September, 2019

Andrei Iancu  
*Director of the United States Patent and Trademark Office*